US006543716B1

(12) United States Patent
Miller et al.

(10) Patent No.: US 6,543,716 B1
(45) Date of Patent: Apr. 8, 2003

(54) SHIPBOARD POINT DEFENSE SYSTEM AND ELEMENTS THEREFOR

(75) Inventors: Vernon W. Miller, Nashua, NH (US); Vincent A. Simeone, Winchester, MA (US); David T. Greynolds, Chelmsford, MA (US); William E. Hunt, Vero Beach, FL (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 05/823,886

(22) Filed: Jul. 28, 1977

(51) Int. Cl.[7] .................................................. F42B 15/16
(52) U.S. Cl. ..................................................... 244/3.21
(58) Field of Search .............................. 244/3.15, 3.21, 244/3.22

(56) References Cited

U.S. PATENT DOCUMENTS

| | | | | |
|---|---|---|---|---|
| 2,692,475 A | * | 10/1954 | Hull | 244/3.22 |
| 2,995,319 A | * | 8/1961 | Kershner et al. | 244/3.21 |
| 3,000,597 A | * | 9/1961 | Bell et al. | 244/3.21 |
| 3,139,033 A | * | 6/1964 | Geissler et al. | 244/3.22 |
| 4,023,749 A | * | 5/1977 | McCorkle, Jr. | 244/3.22 |

* cited by examiner

Primary Examiner—Charles T. Jordan
(74) Attorney, Agent, or Firm—Daly, Crowley & Mofford, LLP

(57) ABSTRACT

A combined defense and navigational system on a naval vessel is disclosed. The disclosed system includes a track-while-scan pulse radar which is controlled to provide either navigational information or tracking information on selected targets. Additionally, the disclosed system includes a plurality of guided missiles, each of which may be vertically launched and directed toward intercept of a selected target either by commands from the track-while-scan radar or from an active guidance system in each such missile.

The invention herein described was made in the course of or under a contract or subcontract thereunder, with the Department of Defense.

6 Claims, 14 Drawing Sheets

ELEVATIONAL CROSS-SECTIONALS
MAIN LOBES

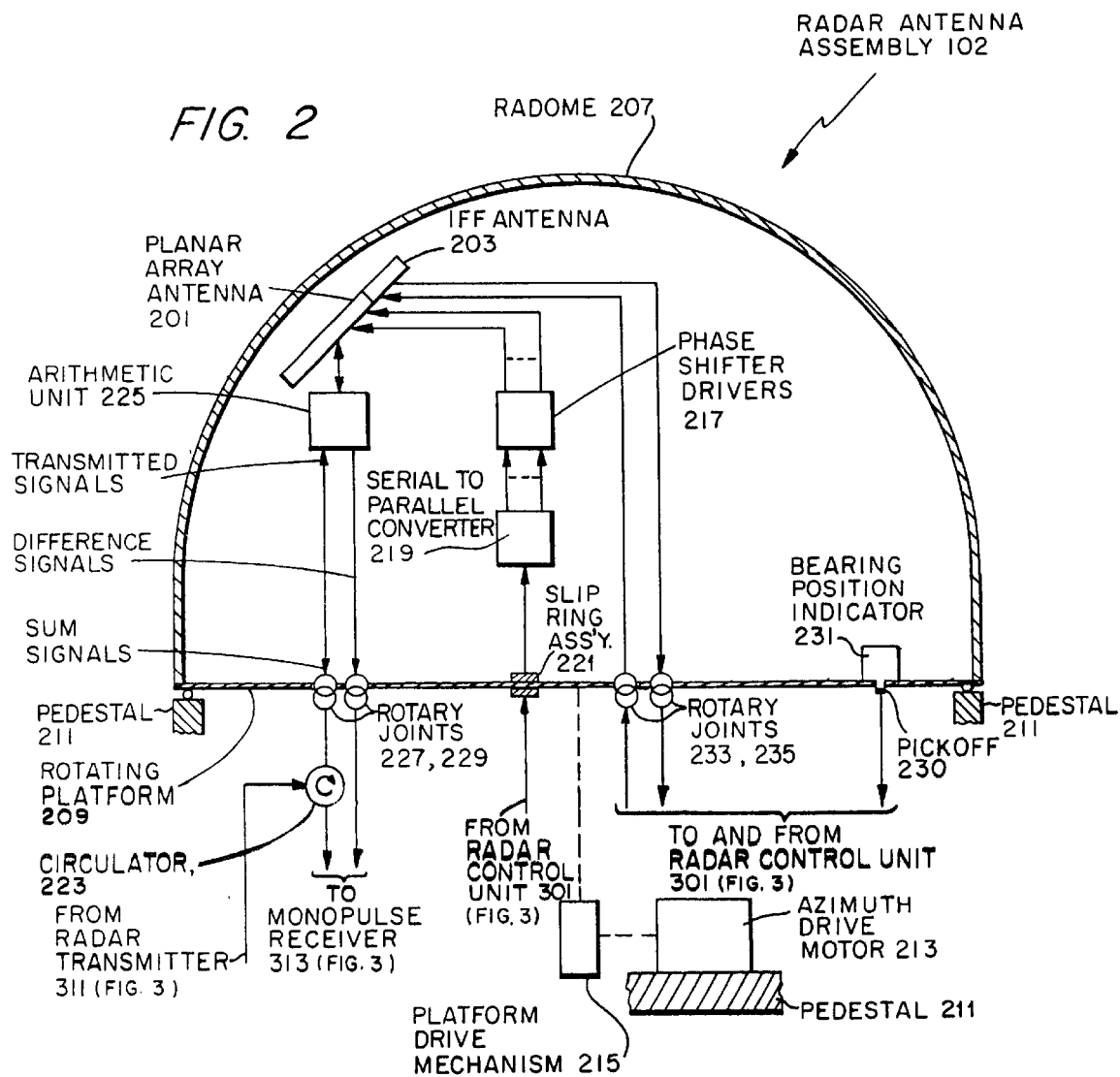

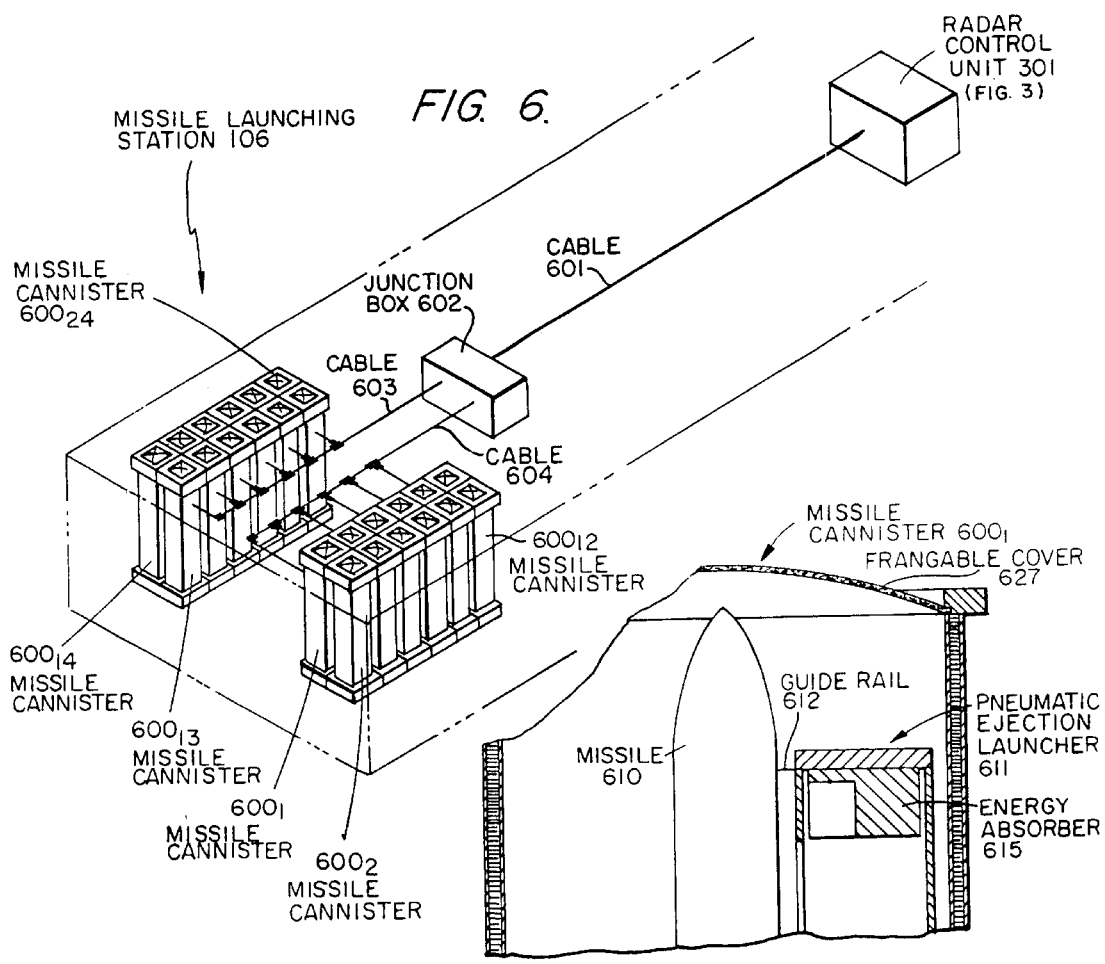
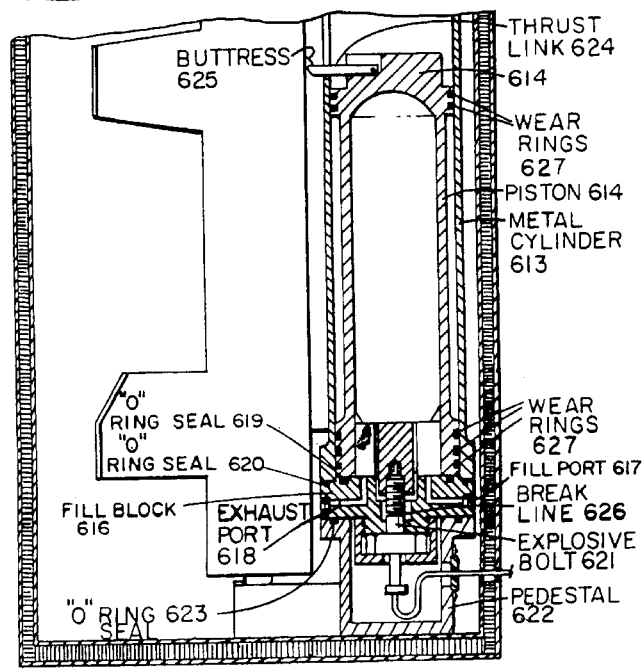
FIG. 6.
FIG. 6A

SHIPBOARD POINT DEFENSE SYSTEM AND ELEMENTS THEREFOR

BACKGROUND OF THE INVENTION

This invention pertains generally to defense systems for naval vessels and particularly to systems of such type which use radar-guided missiles to intercept and to destroy attacking air-craft or missiles and, in addition, may be used to detect and to track surface targets such as other naval vessels and navigational aids.

With the continued development of aircraft and missiles, along with more efficient tactics, a satisfactory solution to the problem of providing a dependable air defense system against air-craft and missiles has become more and more difficult to attain. In particular, when it is desired to provide a so-called "point defense" system for a naval vessel, it is now imperative that provision be made for the capability of modern aircraft and missiles to operate at high speed at very low altitudes. Further, it is imperative that such a defense system be effective when a naval vessel is under attack, either simultaneously or in rapid succession, by a number of aircraft or missiles. In such a situation, provision must be made in the air defense system to allow detection and tracking to be carried out effectively regardless of the number of attacking aircraft or missiles and the approach path of each such aircraft or missile.

As is very well known, uncontrollable interference effects (which almost invariably cause either, or both, a reduction in the range at which an airborne target may be detected or an error in the elevation angle of such a target) are experienced when a ship-borne radar is used to detect aircraft or missiles at low elevation angles over the sea. Therefore, one tactic which modern aircraft and missiles may easily and effectively follow is to attack while flying at very low altitude, where the effectiveness of any known radar-controlled point defense system is a minimum. It is, therefore, manifest that known radar guidance techniques may not always be successfully used and that improved radar guidance techniques, such as one using an active guidance system in an intercepting missile, must be used to attain the desired high degree of effectiveness.

Although the general principles underlying active radar guidance systems have been known for many years, the implementation of any such system in a practical air defense system for a naval vessel has heretofore posed the almost insuperable problem of providing a dependable, lightweight radar transmitter in a missile. The weight of electron discharge devices (along with the requisite high voltage supplies for such devices) and the fragility of electron discharge devices have made it impractical, except in special circumstances, to use any such device in a small missile suitable for the point defense mission.

It has been proposed to use solid state devices, such as IMPATT diodes, to generate the radio frequency energy required in the transmitter of a radar in an active guidance system in a missile. While such devices are light, dependable and require relatively small power supplies, their power outputs are extremely low. It is necessary, therefore, that the power outputs of many solid state devices be combined if a useful amount of radio frequency power is to be attained. While basic techniques for combining the radio frequency outputs of devices such as IMPATT diodes are well known, no technique has yet been developed which would allow efficient use of such devices in a pulse Doppler radar in a missile. In such an application, where pulse lengths may be in the nanosecond range, the known basic techniques (developed for continuous wave operation) referred to above are insufficient in themselves to overcome effects of transients and to provide pulses at predetermined frequencies.

Another basic difficulty in providing a point defense system for a naval vessel derives from the fact that the "reaction time" (meaning the interval between detection of an attacking aircraft or missile and launch of an intercepting missile toward such aircraft or missile) of such a system must be extremely short to allow any possible threat to be met. A short reaction time makes it feasible to reduce the weights and sizes of the elements, such as the radar and the intercepting missiles, used in the system.

The factor limiting reaction time is the time taken actually to launch an intercepting missile on course to intercept. Unfortunately, conventional launching techniques (where intercepting missiles are mounted on launchers which are designed to be trained to align the intercepting missiles with the desired initial flight paths of such missiles) are too slow in operation and too heavy for smaller naval vessels. Further, known launchers cannot practicably be located to have an omnidirectional field of fire. This means that it is quite likely that a violent maneuver immediately after launch (when aerodynamic forces acting on the control surfaces of an intercepting missile are relatively weak) is needed to place an intercepting missile in the correct flight path toward an attacking missile. Any such maneuver is, of course, extremely wasteful of fuel and is, therefore, to be avoided if at all possible.

SUMMARY OF THE INVENTION

In view of the foregoing and other problems in the art as it now exists, it is a primary object of this invention to provide an improved point defense system for a naval vessel, such system utilizing an active radar-controlled missile and a radar adapted to detect and track a plurality of airborne targets, such as aircraft or missiles, whether such targets are at low or high altitudes.

Another object of this invention is to provide an improved point defense system for a naval vessel, such system having a short reaction time so that an intercepting missile may be launched within a few seconds after detection of an attacking aircraft or missile, thereby to overcome any tactical advantage attained by an attacking aircraft or missile during the initial stage of an engagement.

Another object of this invention is to provide an improved point air defense system for naval vessels of any size, such system being characterized by the fact that each one of the intercepting missiles used in such system is vertically launched before ignition of its rocket motor to provide an omnidirectional field of fire for all such missiles and, further, that initial maneuvering is effected, upon ignition of the rocket motor, by thrust vector vanes in the jet stream of the rocket motor.

Another object of this invention is to provide, in a system of the type contemplated herein, a capability to detect and track surface targets so that the system may be used to navigate a naval vessel in restricted waters or to detect and track friendly or hostile ships.

GENERAL

The objects of this invention are generally met in a defense system for a naval vessel by providing:

(a) a "track-while-scan" pulse radar, such radar emitting a beam which is mechanically scanned in azimuth and electronically scanned in elevation to allow a plurality of airborne or surface targets to be detected and tracked, the frequency of the pulses transmitted by such radar being varied in accordance with a predetermined program to reduce the deleterious effects of interference from the surface of the sea;

(b) a radar control unit, selectively responsive to command signals from an operator or to signals from the pulse radar, to cause-the scanning pattern of the beam from the pulse radar to be changed according to the tactical situation and the signals out of the receiver of the pulse radar to be processed to derive input signals for a control computer;

(c) a control computer programmed to respond to input signals from the pulse radar to differentiate between targets which pose a threat and other signals and to produce control signals which are effective either
   (i) to effect tracking of any targets which pose a threat and to launch any one, or ones, of a number of missiles toward any such targets, or
   (ii) to allow navigation of the naval vessel, and (d) a number of missiles for launching, each one of such missiles being an active radar-guided missile which is vertically launched to have a short reaction time and which is adapted either to intercept an attacking aircraft or missile flying at any altitude above the sea or to be directed toward a surface vessel.

BRIEF DESCRIPTION OF THE DRAWINGS

For a more complete understanding of this invention, reference is now made to the following description of a preferred embodiment of this invention as illustrated in the accompanying drawings, wherein:

FIG. 2 is a sketch illustrating the various elements making up the radar antenna assembly of the contemplated shipboard radar;

FIGS. 6 and 6A are sketches showing the elements of the missile launching station in the contemplated system.

DESCRIPTION OF THE PREFERRED EMBODIMENT

Before a detailed description of a preferred embodiment of the contemplated defense system and of the major components of such system is undertaken, it will be helpful to enumerate some of the controlling concepts on which the design of the present system (and components therefor) is based. Thus, because the contemplated defense system is to be used primarily as a point defense system on naval vessels against attacking aircraft or missiles which are capable of operation at extremely low altitudes, and, secondarily, is to be used against other threats and as a navigational aid, the following concepts are incorporated in the system to be described.

(1) Because the range at which aircraft or missiles flying at extremely low altitudes may be detected by a shipboard radar is primarily dependent upon the frequency of the radar and operational conditions (such as sea state or the presence of land masses), and because a capability to track a large number of simultaneously attacking aircraft or missiles must be provided, an X-band radar with frequency agility and moderate power, using what may be termed a "track-while-scan" (TWS) technique, is used as the shipboard radar in the system;

(2) Because a capability must be provided to allow many attacking aircraft or missiles to be intercepted under any operational conditions, an active radar guidance technique is preferred in the seeker in the intercepting missiles contemplated for the system;

(3) Because execution of a successful intercept ordinarily may have to be accomplished in a rather short period of time, the "reaction time" (meaning the interval of time between detection of an attacking aircraft or missile and launching of an intercepting missile toward such aircraft or missile) of the contemplated system is extremely short;

(4) Because the contemplated defense system is to be installed on small naval vessels where space is at a premium, the system is also adapted to be used to detect and track surface vessels as well as aircraft and attacking missiles and, in addition, to be used in navigation of the naval vessel on which such system is installed.

Figure 1:
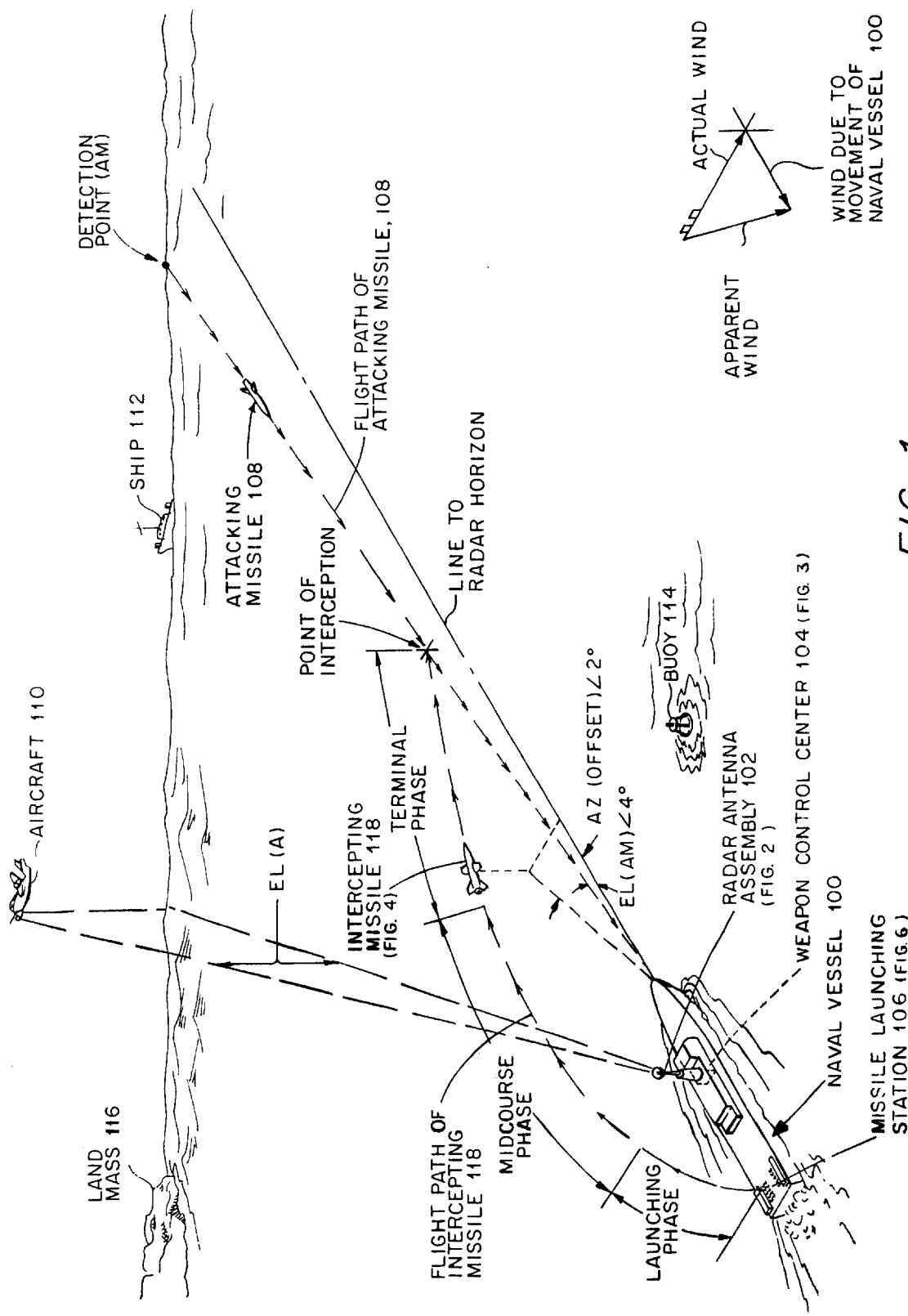
FIG. 1 is a sketch showing the different ways in which the contemplated system may be operated in different tactical situations.
Figure 1A:
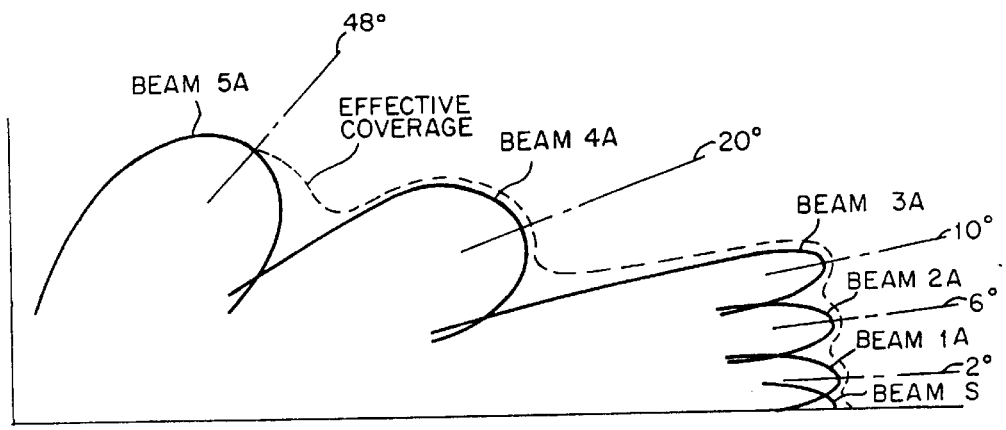
FIG. 1A is a sketch showing the elevational crosssections of the main contemplated shipboard radar.
Figure 1B:
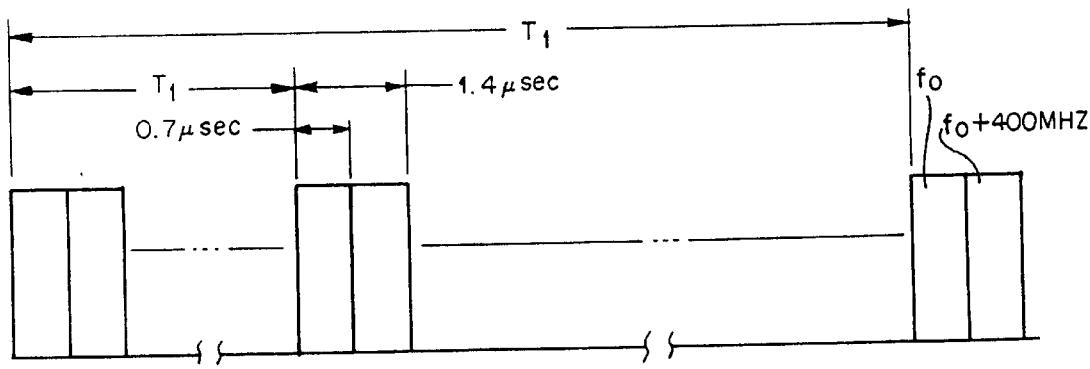
FIGS. 1B and 1C are sketches illustrating the pulses of radio frequency energy transmitted from the contemplated shipboard radar.
Figure 1C:
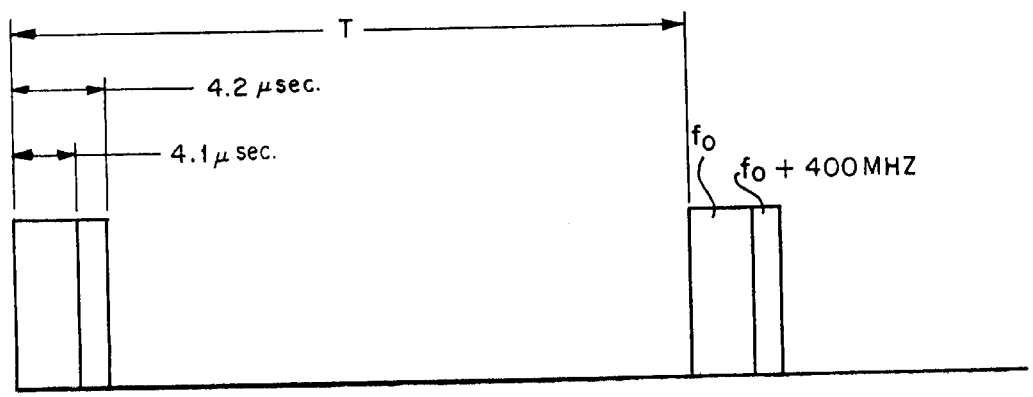

Referring now to FIG. 1, an assumed tactical situation illustrating general features of the contemplated defense system is shown. For convenience, the reference lines (from which the elevation angles to the illustrated airborne targets are measured) are shown to lie in different planes. FIGS. 1A through 1C are sketches showing how a radar on a naval vessel 100 (FIG. 1) may be operated in the defense system of FIG. 1. The equipment making up the contemplated defense system will be illustrated and described in detail hereinafter.

Thus, in FIG. 1, the naval vessel 100 is shown to have installed thereon a radar antenna assembly 102, a weapon control center 104, and a missile launching station 106 which are interconnected in a conventional manner to make up the contemplated defense system.

The radar antenna assembly 102 is mounted on a pedestal (not numbered) in any convenient location on the naval vessel 100 (preferably near the weapon control center 104 to reduce the length of the run of the interconnections between the radar antenna assembly 102 and the weapon control center 104) so that rotatable antennas (not shown in FIG. 1) may be continuously scanned in azimuth (here at a rate of 360° per second). One of the rotatable antennas (hereinafter referred to as the radar antenna) is a planar array of antenna elements which may be electronically scanned in elevation as desired. It will be appreciated that scanning in elevation is effected in accordance with commands from the weapon control center 104, as modified by signals from attitude sensors, i.e. pitch and roll sensors (not shown), on the naval vessel 100. Therefore, as the radar antenna is continuously scanned in azimuth, the elevation angle of the beam from such antenna (relative to any convenient reference as, for example, the plane defined by the radar horizon) may be changed in accordance with any desired program to effect a search in three dimensions for (i) airborne targets (such as the attacking missile 108 or an aircraft 110) at any elevation angles within any selected range of elevation angles, (ii) for seaborne targets (such as a ship 112 or a buoy 114) or (iii) other targets (such as a land mass 116). An exemplary search program which concentrates on the detection of attacking missiles at low altitudes yet allows the detection of other types of targets is shown in TABLE I below:

TABLE I

| AZIMUTH SCAN NO. | 1 | 2 | 3 | 4 | 5 | 6 | 7 | 8 | 9 | 10 |
|---|---|---|---|---|---|---|---|---|---|---|
| BEAM (FIG. 1A) | 1A | 2A | 1A | S | 1A | 3A | 1A | 4A | 1A | 5A |
| PULSE REPETITION FREQUENCY (KHz) | 7/6.3 | 7/6.3 | 7/6.3 | 2.33 | 7/6.3 | 7/6.3 | 7/6.3 | 7/6.3 | 7/6.3 | 7/6.3 |
| WAVE FORM (FIGS. 1B, 1C) | 1B | 1B | 1B | 1C | 1B | 1B | 1B | 1B | 1B | 1B |

From TABLE I it may be seen that, in each successive group of ten complete azimuth scans (each of which here is accomplished in one second) of the radar antenna, beam 1A (FIG. 1A) is propagated during five azimuth scans and each one of the other beams (beams 2A, 3A, 4A, SA and S (in FIG. 1A) is propagated during one azimuth scan. As shown in FIG. 1A, beam 1A here has a beamwidth, in elevation, of 4° (approximately). The other beams (beams S, 2A, 3A, 4A, 5A) have beamwidths, in elevation, and beam elevation angles as shown in FIG. 1A. It will be appreciated that the search program of TABLE I may be changed without departing from the inventive concepts.

The row labeled "PULSE REPETITION FREQUENCY (KHz)" in TABLE I shows that, whenever beams 1A, 2A, 3A, 4A, 5A are propagated, a staggered pulse repetition frequency is used. As is well known, a staggered pulse repetition frequency eliminates "blind speeds" in a Doppler radar and allows "multiple time" echo signals to be distinguished from echo signals from targets of interest. The row labeled "WAVEFORM" in TABLE I shows that, whenever beams 1A, 2A, 3A, 4A, SA are propagated, each radiated pulse is made up of two substantially equal subpulses (as indicated in FIG. 1B) and that, whenever beam S is being propagated, each radiated pulse is made up of a relatively long subpulse and a relatively short subpulse. Finally, as indicated in TABLE II below, the frequencies of the transmitted signals are changed whenever the azimuth of the beam changes by an angle equal to one-half beamwidth.

TABLE II

| | FREQUENCY (MHz) | | | |
|---|---|---|---|---|
| 1st Subpulse | 8620 | 8660 | 8700 . . . 8940 | 8980 |
| 2nd Subpulse | 9020 | 9060 | 9100 . . . 9340 | 9380 |

The frequency diversity between subpulses along with the frequency agility between bursts of pulses and the elevation angle of beam IA are effective to reduce the effects of reflections from the surface of the sea. Thus, if it be assumed that: (a) the beamwidth, in azimuth, of beam 1A is approximately 2°; (b) the pulse repetition frequency is staggered between 7 KHz and 6.3 KHz; and, (c) the scan rate, in azimuth, is 360°/sec., then, when beam 1A is propagated:

1. The main lobe of beam 1A is elevated to such extent that the surface of the sea may be illuminated, and echo signals reflected off the surface of the sea may be received only through the sidelobes of such beam;
2. Even a small target at low altitude (such as the attacking missile 108 (FIG. 1) within the main lobe of beam 1A is illuminated by a number (approximately sixteen to eighteen at a minimum) of successive pulses as the beam moves in azimuth; and
3. The electrical length of the path of echo signals reflected off the surface of the sea is changed from subpulse to subpulse as well as from burst to burst.

It follows that, even in the worst case, i.e. when the sea is calm enough to allow specular reflection to take place: (a) the amplitude of echo signals (sometimes referred to as multipath signals) from any target at a low altitude reflected off the surface of the sea is lower than the amplitude of echo signals (sometimes referred to as direct signals) directly reflected from such a target; and (b) the difference in phase between direct signals and multipath signals changes from subpulse to subpulse and from burst to burst# making it unlikely that completely destructive interference between such signals may be experienced during any given azimuth scan.

It will be observed that tracking of different targets could possibly be accomplished without changing the search pattern shown in TABLE I. However, the interval between successive "updates" of the tracking information for any particular target would be dependent upon the elevation angle of each target. That is to say, if tracking of a detected target were to be attempted without changing the search pattern shown in TABLE I, updates of the tracking information for a detected target in beam 1A would occur at two second intervals and, for a detected target in any other beam, at ten second intervals.

While some noncrucial tactical situations may exist in which the intervals between updates of tracking information may be as just noted above, it is evident that in crucial tactical situations, e.g. when a detected target has not been identified or when an attack is actually being mounted by an aircraft or missile, the interval between successive updates of tracking information should be as short as possible. One way to effect such an end, while still maintaining a search for new targets, is to cause the search program shown in TABLE I to be interrupted each time the azimuth angle of a detected target is approached so that the beam may be steered to the elevation angle of such target during each azimuth scan until illumination of the target is completed. After that, the beam would, of course, be steered (in elevation) to resume the search program. It will be apparent, then, that the interval between successive updates of the tracking information for any detected target would then be one second, regardless of the elevation angle of such target. With such a modification of the search program it would be extremely unlikely that any detected target would be lost, even one which may undertake violent evasive maneuvers at high speed.

A one second interval between successive updates of tracking information of an intercepting missile is here contemplated. Thus, whenever an intercepting missile is launched to follow a predetermined initial course, the position of such missile relative to the naval vessel from which it was launched may be calculated continuously. To transmit midcourse uplink messages to the intercepting missile the beam is spoiled to allow for the uncertainty in the elevation angle of such missile. The beam spoiling occurs only for two very short intervals equivalent to a very small fraction (less than ten per cent) of an antenna dwell time (azimuth beamwidth 2° divided by scan rate 360° per second). In order then to transmit commands at reasonable intervals to the intercepting missile during the midcourse phase of flight, it is here contemplated that the search pattern be interrupted during each azimuth scan at each such calculated azimuth during the midcourse phase of flight.

Other tactical situations may exist under which the search program set forth in TABLE I need not be modified to obtain adequate tracking information. For example, once a detected target has been identified as a friendly vessel or aircraft, or once a detected target has been identified as a navigational aid, it may not be essential to reduce the interval between successive updates of tracking information.

Referring back again in particular to FIG. 1, the attacking missile 108 (after detection at the point marked "DETECTION POINT (AM)"), is shown to be directly closing on the naval vessel 100 along a path marked "FLIGHT PATH OF ATTACKING MISSILE." The elevation angle (EL(AM)) of the attacking missile 108 is shown to be less than 4°. Obviously, then, the attacking missile 108 is illuminated by either beam 1A or beam S (FIG. 1A). Equally obviously, the actual elevation angle of the attacking missile 108 cannot be measured with a high degree of precision from the naval vessel 100.

An intercepting missile 118 from the naval vessel 100 is shown to be entering the terminal phase of flight toward the attacking missile 108. The intercepting missile will be described hereinafter. Suffice it to say here that in the terminal phase of flight the intercepting missile 118 is under the control of an active radar seeker. Such seeker here includes a pulse radar transmitter and a monopulse receiver with a common gimballed antenna for tracking the attacking missile 108 to determine, in a conventional manner, the "line-of-sight error rate" between the intercepting missile 118 and the attacking missile 108. Such a rate then is used to control the flight path of the intercepting missile 118 to the point marked "INTERCEPTION POINT" where a warhead in the intercepting missile 118 is detonated to destroy the attacking missile 108. It will be observed that, in the exemplary tactical situation being described, the path of the intercepting missile 118 in the terminal phase is from above the attacking missile 108. Such a course increases the grazing angle of the beam from the intercepting missile 118 to such an extent that multipath reflections from the attacking missile 108 are of little moment, regardless of the sea state.

The prior phases of flight of the intercepting missile 118 are indicated "LAUNCHING PHASE" and "MIDCOURSE PHASE". In the former phase, the intercepting missile 118 is, in accordance with command signals from the weapon control center 104, first selected from among the intercepting missiles at the missile launching station 106 and then launched (here pneumatically in a direction normal to the plane of the deck of the naval vessel 100). After the intercepting missile 118 is clear of the naval vessel 100 the rocket motor (not shown) in the intercepting missile 118 is ignited. After the rocket motor is ignited, the intercepting missile 118 is first directed toward the flight path to be taken in the midcourse phase of flight (either by vanes in the exhaust of the rocket motor or by control wings) in accordance with commands from the weapon control center 104 stored in an on-board computer prior to liftoff. It will be appreciated that compensation for factors such as the cant of the deck of the naval vessel 100 at liftoff and the strength and direction of the apparent wind may be easily effected by modifying the commands to the intercepting missile 118 prior to liftoff.

It will also be observed that the azimuth angle of the intercepting missile 118 during the midcourse phase of flight is offset (as indicated by the angle marked AZ(OFFSET) from the azimuth angle of the attacking missile 108. Such offset allows the search pattern to be interrupted during each scan to update tracking information on both the intercepting missile 118 and the attacking missile 108. With the rate of receipt of tracking information of both such missiles at a maximum, the best possible estimates of any errors in the flight path of the intercepting missile 118 and the orientation of the gimballed antenna in such missile may be made on board the naval vessel 100. Commands to reduce such errors to a minimum are then transmitted to the intercepting missile 118.

It is here noted that it may be possible (when, for example, the approach of an attacking aircraft or missile is made at a low altitude over a land mass) for the range to the detection point be very short. In such a situation, there would not be sufficient time to execute the midcourse phase just described. Therefore, according to the concepts of the contemplated air defense system, when detection occurs at a relatively short range, only the launching and terminal phases are commanded. This means that the orientation of the gimballed antenna in the selected intercepting missile is set prior to launch and no offset angle is commanded.

A similar situation, of course, may exist for the second intercepting missile if the so-called "shoot-look-shoot" procedure is used against an attacking aircraft or missile which is initially detected at a relatively long range.

To complete the description of the exemplary tactical situation shown in FIG. 1 the rationale of beam S will be explained. Thus, it will be seen in FIG. 1 that the maneuvering room for the naval vessel 100 is restricted by the land mass 116 and the buoy 114 marking an underwater obstruction of some kind. Further, at a relatively long range, the ship 112 (here assumed to be hostile) is a threat. Referring to FIG. 1C, it may be seen that each pulse transmitted in beam S is made up of two subpulses of different frequencies and length. Further, referring to TABLES I and II, it may be seen that the pulse repetition frequency (when beam S is being propagated) is 2.33 KHz and that "pulse-to-pulse" frequency diversity exists in the same way as for beam 1A. These parameters then extend the nonambiguous range, concentrate the greater part of the power in each pulse in one subpulse to extend the range of detection, provide a means for more precise ranging on targets at short range and, finally, reduce the effects of sea echo. The result is that the precision of ranging on surface targets at long range (such as the ship 112) and on surface targets at short range (such as the buoy 114 and points on the land mass 116) may be selected to meet circumstances. Obviously, any conventional filtering technique may be used to allow only echo signals derived from the narrower subpulse in each pulse to be effective in ranging on targets such as the buoy 114 or points on the land mass 116.

Before referring specifically to FIG. 2, it should be realized that, for convenience, the elements making up the radar antenna assembly 102 have been shown in a fashion which illustrates the functional features of such elements rather than their physical features. Such an approach has been taken because, it is felt, the constructional details of the various elements in the radar antenna assembly 102 and the way in which such elements are mounted will become obvious to a man of skill in the art as the explanation of FIG. 2 proceeds.

With the foregoing in mind it may be seen in FIG. 2 that there are two antennas (a planar array antenna 201 and an IFF antenna 203) in the radar antenna assembly 102, such antennas being disposed within a common radome 207 affixed to a rotating platform 209. The latter is rotatably mounted (by means of bearings, not numbered) on a pedestal (portions of which are indicated in FIG. 2 and designated by the numeral 211). In operation, then, the rotating platform 209 is continuously rotated by an azimuth drive motor 213 through a platform drive mechanism 215 of any conventional construction. It follows that, with a rotational speed of one revolution per second, the planar array antenna 201 and the IFF antenna 203 each complete a complete azimuth scan of 360° in one second.

The planar array antenna 201 here is an array of 1792 dipole elements (not shown) divided between 28 identical horizontally oriented stripline circuits (not shown) stacked vertically. Each one of the 28 stripline circuits in turn is connected to dipole elements disposed to produce horizontally polarized radiations at X-band (8.6 to 9.4 GHz). The planar array antenna 201 may, therefore, be deemed to consist of 64 columns of dipole elements and 28 rows of dipole elements. With appropriate tapering of the radio frequency power applied to the dipole elements, the angular dimensions (two way) of the beams at the various elevation angles are, in azimuth 2° and, in elevation programmable from, say, 40 to 15°. The beams are generated and directed by appropriately controlling phase shifters (not shown but which here are conventional digital phase shifters) connected in circuit with the dipole elements and the stripline circuits. Beams S, 1A, 2A and 3A are focused beams, differing only in their elevation angles. Beams 4A and 5A are defocused beams (in elevation).

Figure 3:
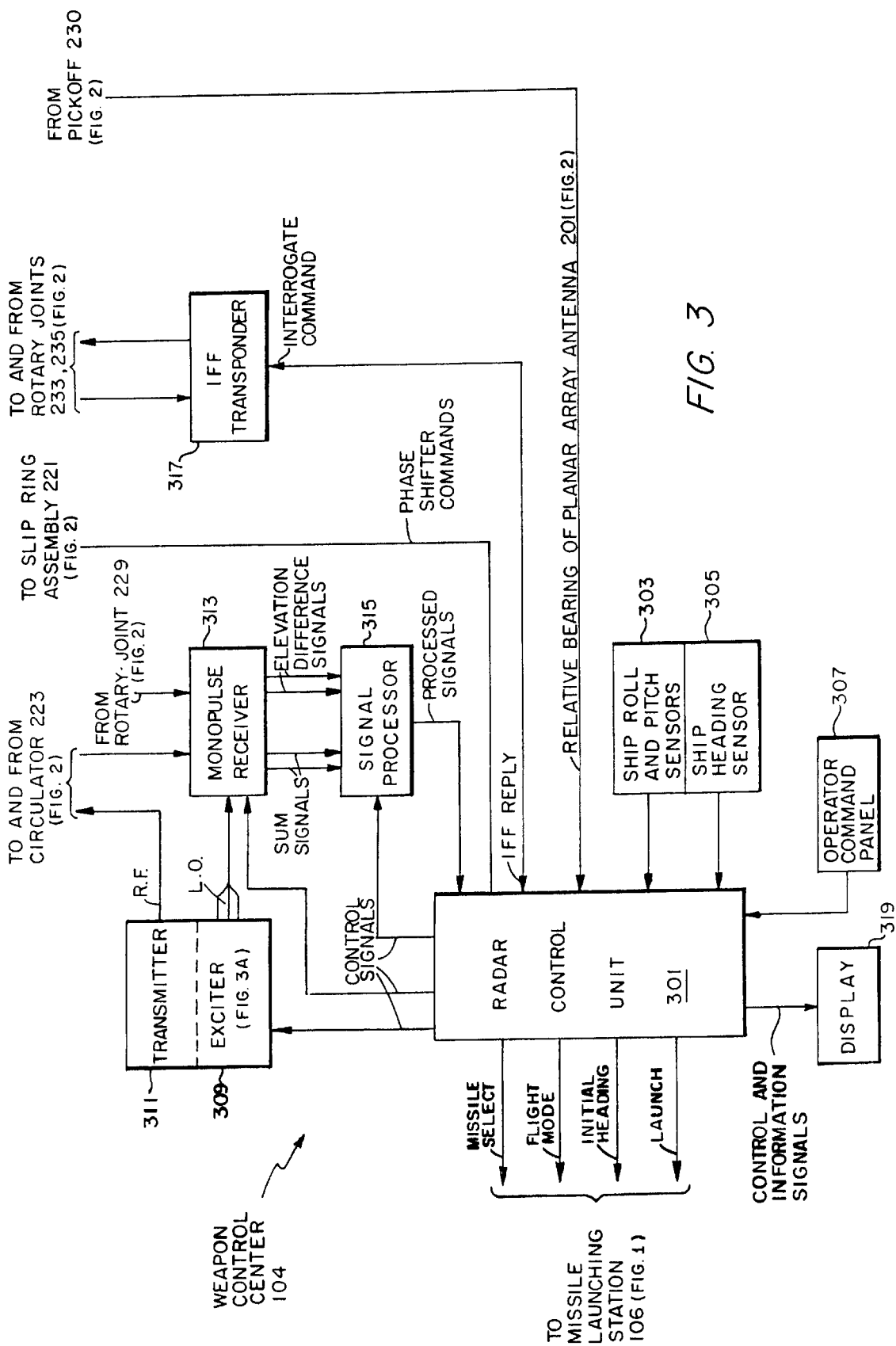
FIG. 3 is a block diagram showing generally the elements in the radar control unit used in the contemplated system.

The control signals for the phase shifters are derived from phase shifter drivers 217 (here there are twenty-eight such drivers, each one driving the phase shifters in a row thereof). The individual ones of the phase shifter drivers are, in turn, controlled by signals from a serial-to-parallel converter 219 (here twenty-eight registers, each having a capacity to store a digital word ultimately designating the settings of the phase shifters in each row). The registers in the serial-to-parallel converter are loaded serially through a slip ring assembly 221 from a radar control unit 301 (FIG. 3).

With the face of the planar array antenna 201 tipped so that its boresight line is inclined at an angle of 15° with respect to the rotating platform 209, it will be immediately apparent that, in the absence of any pitching or rolling of the naval vessel 100 (FIG. 1), the beam from the planar array antenna 201 may be easily and rapidly scanned electronically in elevation from say −30° to +60° in elevation with respect to the radar horizon. Such a capability, then, allows compensation for pitch and roll of the naval vessel 100 to be effected simply by modifying the digital words out of the radar control unit 301 (FIG. 3) in accordance with the pitch and roll of the naval vessel 100.

It has been noted hereinbefore that the planar array antenna 201 is used in a monopulse radar. As is customary in such a radar, signals to be transmitted are passed from a radar transmitter 311 (FIG. 3) through a circulator 223 and an arithmetic unit 225, to the planar array antenna 201. Received signals (the sum signals and elevation difference signals) are then passed as shown from the planar array antenna 201 to a monopulse receiver 313 (FIG. 3). Appropriate rotary joints 227, 229 are provided to allow the radar antenna assembly 102 to be rotated in azimuth.

It will be noted here that the use of electronic scanning in elevation allows the elevation angle of any detected target (except one detected in either beam 1A or S) to be measured to a high degree of precision. Thus, let it be assumed that a target is detected in the sum channel of the monopulse receiver 313 (FIG. 3) during a particular azimuth scan when, say, beam 3A is being propagated in accordance with the program in TABLE I. At detection, the true azimuth of such target is ascertained by appropriately combining the outputs of a pickoff 230 of an antenna bearing position indicator 231 and a ship heading sensor 305 (FIG. 3). At the same time, any imbalance in the elevation difference channel in the monopulse receiver is also measured. Such signals are stored in the radar control unit 301 (FIG. 3) to provide command signals on the next following azimuth scans when the true azimuth of the previously detected target is approached (noting that beam 1A is being then propagated if the program in TABLE I is being followed) to: (a) cause beam 3A to be propagated; (b) change the elevation angle of beam 3A to null the elevation difference signal; and (c) return, after scanning through the previously detected target, to the program being followed.

It will be recalled from the earlier dissertation that the elevation angle of the centerline of the sum pattern of beam 1A cannot be less than one-half the beamwidth of such beam. It follows then that, if the elevation angle of a detected target is less than such minimum angle, there will, almost without fail, be an imbalance in the elevation difference channels. While such an imbalance cannot be nulled as described in the previous paragraph to allow the elevation angle of a detected target to be determined with the degree of precision inherent in the monopulse technique, it is not essential in this situation to determine such elevation angle. As long as it is known that a detected target is in the sum pattern of beam 1A the boresight line of an antenna (planar antenna array 407AA in FIG. 4) in the intercepting missile 118 (FIGS. 1 and 4) may be directed with a sufficiently high degree of accuracy to allow such missile to be launched and to effect a successful intercept.

Obviously, when a target is detected in beam S alone, there is no need to be concerned with the condition of the elevation difference channel. It will be noted that, in the just described process, any effect of yaw on the naval vessel 100 (FIG. 1) is eliminated so the true azimuth of any detected target may also be determined with a high degree of precision by well known centering techniques.

The IFF antenna 203 is preferably mounted so that the centerline of its beam is parallel to the boresight line of the planar array antenna 201, the interrogating signals and reply signals fed through rotary joints 233, 235, as shown.

Referring now to FIG. 3 it may be seen that the main element in the weapon control center 104 is an element designated as a radar control unit 301. Such unit is shown to receive various condition indicating signals from the elements in the radar antenna assembly 102 (FIGS. 1 and 2) and sensing elements (ship roll and pitch sensors 303 and ship heading sensor 305) as well as commands from an operator command panel 307. In response to the various condition indicating signals, command and control signals are generated in the radar control unit 301 to: (a) trigger an exciter 309 (described in more detail in connection with FIG. 3A) which, in turn, produces radio frequency signals (here assumed ordinarily to be in accordance with the program shown in TABLE II) for a transmitter 311 and local oscillator signals of appropriate frequencies for a monopulse receiver 313; (b) produce phase shifter commands for the phase shifter drivers 217 (FIG. 2) to effect the desired scanning program (such as the one set forth in TABLE I with modifications as discussed hereinbefore for detected targets) even though the naval vessel 100 (FIG. 1) may be pitching and rolling; (c) combine the information from the bearing position indicator 231 (FIG. 2) and the ship heading sensor 305 to determine the true bearing of the beam from either the planar array antenna 201 (FIG. 2) or the IFF antenna 203 (FIG. 2); (d) produce control signals for a signal processor 315 (which is responsive to the signals out of the monopulse receiver 313); (e) produce IFF interrogate command signals for an IFF transponder and process any reply; (f) produce control and information signals for a display 319, and (g) produce appropriate command signals for the missile launching station 106 (FIG. 1) to select and to launch a missile.

It will be appreciated that the radar control unit 301 may be a general purpose digital computer. For example, a Raytheon Data Systems Model RDS-500 may be used.

The transmitter 311 may be conventional although it is preferred that a traveling wave tube, TYPE 751-H, be used as a power amplifier with its modulating signals being provided by the exciter 309.

The signal processor 315 preferably is similar to the one shown in U.S. Pat. No. 3,875,391 entitled "Pipeline Signal Processor", inventors Gerald N. Shapiro and Herbert S. Sobel, which is assigned to the same assignee as the present application.

Figure 3A:
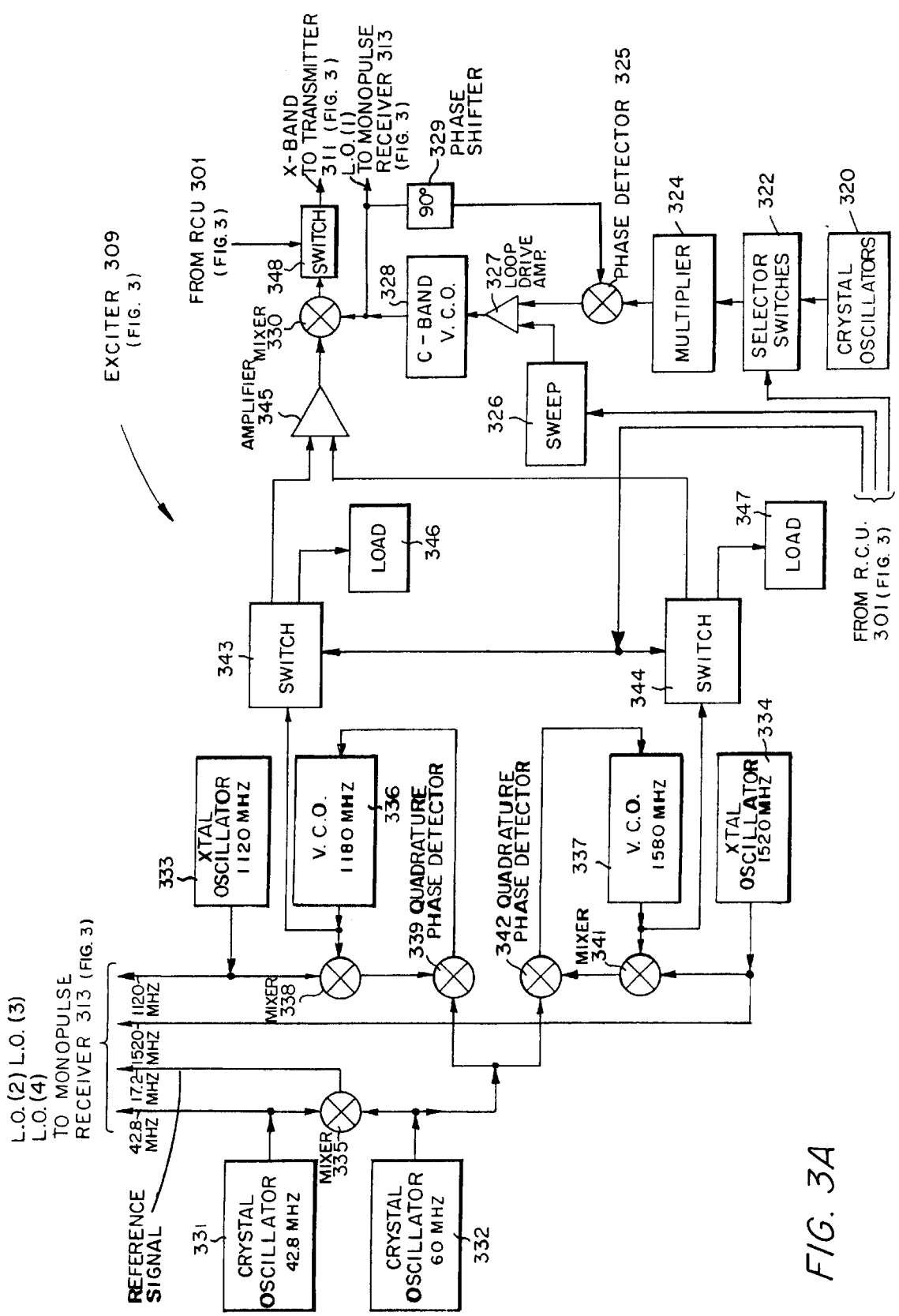
FIG. 3A is a simplified block diagram of the exciter for the transmitter in the shipboard radar for the contemplated system.

Before referring to FIG. 3A in detail, it will be noted in passing that conventional power dividers are there represented simply as dots in the paths of the various radio frequency signals, with arrows indicating the input and output ports of such dividers. It is felt that a man of ordinary skill in the art would know the proper type of power divider for each different radio frequency signal.

With the foregoing in mind, it may be seen that the exciter 309 comprises circuitry for producing both the coded transmitted signals shown in FIGS. 1B and 1C and in TABLE II and the requisite local oscillator signals for each different one of the two receiving channels of the monopulse receiver 313 (FIG. 3).

Referring now to the circuitry shown in the lower right hand part of FIG. 3A, such circuitry is arranged to provide a selection of one of ten predetermined frequencies spaced 40 MHz apart in the band from 7440 MHz to 7800 MHz. Thus, a bank of crystal oscillators 320 (there being a separate crystal oscillator corresponding to a submultiple of each one of the frequencies in TABLE II) are connected, through selector 322, to a frequency multiplier 324 which produces C-band signals. The selector switches 322 are controlled by control signals from the radar control unit 301 (FIG. 3). A control signal from radar control unit 301 (FIG. 3) is also shown to be applied to sweep circuitry 326, the output of which is shown to be applied to drive amplifier 327, ultimately to control the frequency of a C-band voltage controlled oscillator 328 (hereinafter sometimes referred to simply as VCO 328). A portion of the output signal from VCO 328 is applied through 90° phase shifter 329 to phase detector 325. The second input signal to phase detector 325 is provided from frequency multiplier 324.

It will now be recognized by those of skill in the art that frequency multiplier 324 serves as a reference frequency generator to control the frequency of VCO 328 by means of a phase lock loop comprising phase detector 325, loop drive amplifier 327, VCO 328 and 90° phase shifter 329. The requisite frequency agility is realized by first slewing VCO 328 to the region of the desired frequency by means of a control signal from radar control unit 301 (FIG. 3) being applied via sweep circuitry 326 and loop drive amplifier 327 to VCO 328. An identical control signal from radar control unit 301 is applied to selector switches 322 thereby selecting the appropriate crystal oscillator from the bank of crystal oscillators 320. To assist in obtaining phase lock between VCO 328 and the output signal from frequency multiplier 324 (which is determined by the frequency of the selected one of crystal controlled oscillators 320) sweep circuit 326 slews VCO 328 within the capture range of the phase lock loop, thereby narrowing the capture range for phase lock. A sample and hold circuit (not shown) within loop drive amplifier 327 senses a phase lock, as indicated by the signal out of phase detector 325, and positions VCO 328 to that particular frequency as determined from the voltage out of sweep circuit 326. The sample and hold circuit (not shown) thereby inhibits sweep circuit 326 after acquisition of a phase lock.

The output signal from C-band VCO 328 is applied to mixer 330 to form, in a manner to be described, the X-band frequencies listed in TABLE II. It will be noted here in passing that the same output signal from VCO 328 provides the first local oscillator signal (marked L.O. (1) and sometimes so designated hereinafter) to the two receiving channels of the monopulse receiver 313 (FIG. 3). With the frequencies of the first and second subpulses in each transmitted pulse (and in each received pulse) differing by 400 MHz as indicated in TABLE II, it is manifest that heterodyning L.O. (1) with the subpulses in any received pulse results in two different intermediate frequency signals being formed. Appropriate filtering may then be employed to direct such to intermediate frequency signals into different channels in the monopulse receiver 313 (FIG. 3).

Exciter 309 is also shown to include a 42.8 MHz crystal-controlled oscillator 331, a 60 MHz crystal-controlled oscillator 332, a 1120 MHz crystal-controlled oscillator 333 and a 1520 MHz crystal-controlled oscillator 334, all of which are of conventional design, and are arranged in a manner to be described, to provide first and second subpulses at frequencies of 1180 MHz and 1580 MHz, respectively. The output signal from the 42.8 MHz crystal-controlled oscillator 331 is shown to be split, with a portion being provided to monopulse receiver 313 (FIG. 3) as an L.O. (4) signal and a portion being applied to mixer 335. The 42.8 MHz signal is heterodyned in mixer 335 with a 60 MHz signal from a 60 MHz crystal-controlled oscillator 332 to produce a 17.2 MHz reference signal which is also sent to monopulse receiver 313 (FIG. 3) for reasons which will be explained in greater detail hereinafter with reference to FIG. 3C. The output signals from the 1120 MHz crystal-controlled oscillator 333 and the 1520 MHz crystal-controlled oscillator 334 are also shown to be split, with portions thereof being applied to monopulse receiver 313 (FIG. 3) as L.O. (2) and L.O. (3) signals, respectively.

Exciter 309 is also shown to include a 1180 MHz voltage controlled oscillator 336 (hereinafter referred to simply as VCO 336) and a 1580 MHz voltage controlled oscillator 337 (hereinafter referred to as VCO 337). The output signal from VCO 336 is shown to be split, with a portion thereof being applied to mixer 338 wherein it is heterodyned with a portion of the signal from the 1120 MHz crystal-controlled oscillator 333 to produce a 60 MHz output signal. The 60 MHz signal from mixer 338 is applied to quadrature phase detector 339 wherein it is detected against a reference signal obtained by passing a portion of the output signal from 60 MHz crystal-controlled oscillator 332. The output signal from quadrature phase detector 339 is applied via a low pass filter (not shown) and a loop shaping amplifier (also not shown) to VCO 336, ultimately to control the frequency of VCO 336. It will now be recognized by those of skill in the art that the just described elements comprise a phase lock loop to lock the frequency of VCO 336 to that of the 60 MHz crystal-controlled oscillator 332.

The output frequency of VCO 337 is controlled in a similar fashion. Thus, a portion of the output signal from VCO 337 is applied to mixer 341 wherein it is heterodyned with a portion of the signal from the 1520 MHz crystal-controlled oscillator 334 to produce a 60 MHz output signal. Such 60 MHz signal is passed to quadrature phase detector 342 wherein it is phase detected against a reference signal obtained from 60 MHz crystal-controlled oscillator 332. The output signal from phase detector 342 is passed via a low pass filter (not shown) and a loop shaping amplifier (also not shown) to VCO 337 to control the frequency of that element.

The output signals from VCOs 336, 337 are also shown to be applied to a pair of switches 343, 344, respectively, which are controlled by control signals supplied by radar control unit 301 (FIG. 3). In order to form first and second subpulses at frequencies of 1180 and 1580 MHz, respectively, radar control unit 301 (FIG. 3) alternately selects, via switches 343, 344, the output signals from either VCO 336 or VCO 337. The selected frequency is applied via amplifier 345 to mixer 330 wherein it is heterodyned with the output signal from C-band VCO 328 to form the transmitted frequencies indicated in TABLE II. Loads 346, 347 are provided, as shown, on switches 343, 344 to alternately absorb, in response to the control signals provided by radar control unit 301 (FIG. 3), the RF energy from VCOs 336, 337. Finally, a switch 348, which includes a load (not shown) and which is also controlled by control signals from radar control unit 301 (FIG. 3), is included to provide a degree of pulse shaping and also to prevent CW signals from exciter 309 from being sent to the transmitter 311 (FIG. 3) during the interpulse period.

Figure 3B:
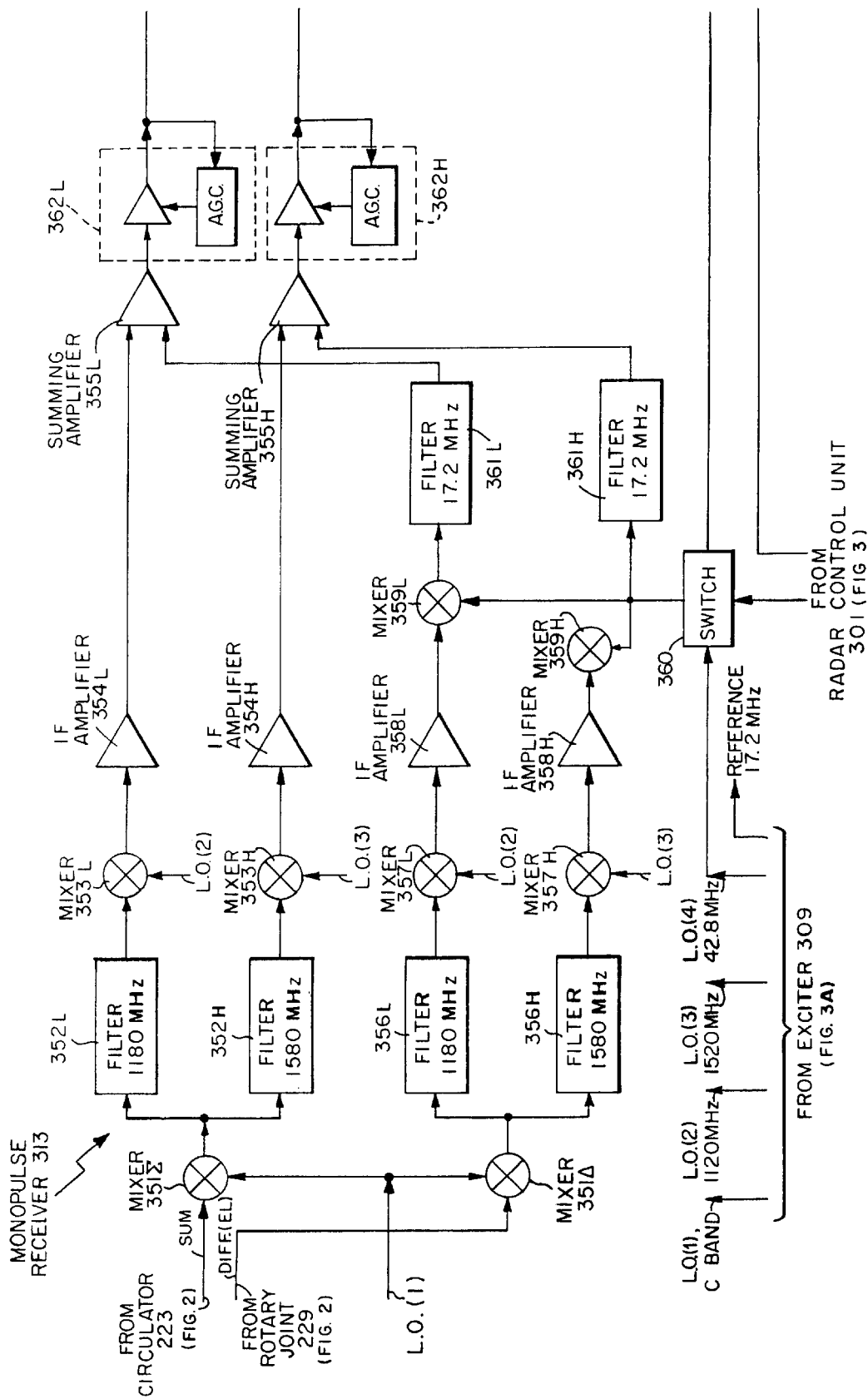
FIGS. 3B and 3C are simplified block diagrams of the monopulse receiver in the shipboard radar for the contemplated system.
Figure 3C:
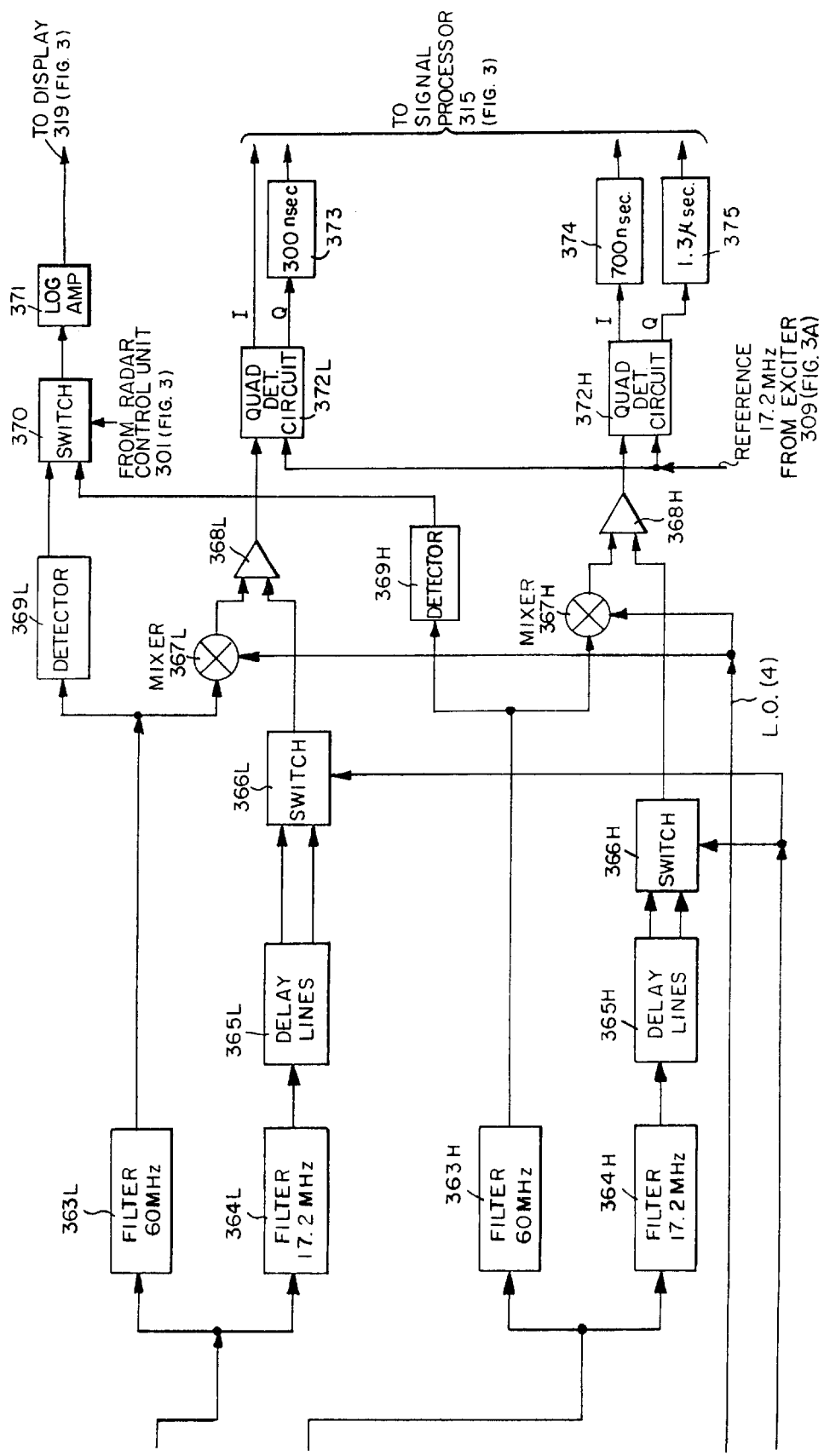

Before referring to FIGS. 3B and 3C in detail, it will be noted that conventional power dividers are, again, there represented simply as dots in the paths of the various radio frequency signals, with arrows indicating the input and output ports of such dividers. It is felt that one of ordinary skill in the art would know the proper type of power divider for each different radio frequency signal. It is also noted that monopulse receiver 313 is a two-channel device, one channel corresponding to the lower frequency sub-pulse listed in Table II and the remaining channel corresponding to the higher frequency subpulse in Table II. The letter "IL" in a reference numeral is used to designate components in the low frequency channel, while the letter "H" in a reference numeral designates a corresponding high frequency channel component.

Referring now to FIG. 3B, monopulse receiver 313 is shown to accept the monopulse sum ($\Sigma$) channel signal from circulator 223 (FIG. 2) and the elevation difference channel signal ($\Delta$) from rotary joint 229 (FIG. 2). The $\Sigma$ and $\Delta$ channel signals are downconverted to suitable L-band signals by being heterodyned in mixers 351$\Sigma$ and 351$\Delta$, respectively, with the L.O. (1) signal from exciter 309 (FIG. 3A). The L-band $\Sigma$ channel signal is frequency diplexed into an 1180 MHz signal and a 1580 MHz signal by being passed through an 1180 MHz band pass filter 352L and a 1580 MHz band pass filter 352H. The 1180 MHz and 1580 MHz signals are downconverted to 60 MHz I.F. signals by being mixed in mixers 353L and 353H with the 1120 MHz L.O. (2) and 1520 MHz L.O. (3) signals, respectively, from exciter 309 (FIG. 3A). After suitable amplification in I.F. amplifiers 354L and 354H, the 60 MHz $\Sigma$ channel signals are passed to summing amplifiers 355L and 355H.

The $\Delta$ channel signals are also frequency diplexed into two separate channels by passing such signals through an 1180 MHz band pass filter 356L and a 1580 MHz band pass filter 356H. These signals are subsequently downconverted to 60 MHz I.F. signals by being heterodyned in mixers 357L and 357H with the 1120 MHz L.O. (2) and 1520 MHz L.O. (3) signals from exciter 309, as shown. The 60 MHz $\Delta$ channel signals from mixers 357L and 357H are amplified by I.F. amplifiers 358L and 358H, respectively, prior to being downconverted to 17.2 MHz I.F. signals by being heterodyned in mixers 359L and 359H with the 42.8 MHz L.O. (4) signal from exciter 309 (FIG. 3A). It is here noted that the 42.8 MHz L.O. (4) signal is applied to mixers 359L and 359H via a switch 360. Switch 360, which is controlled by a signal from radar control unit 301 (FIG. 3), is used to gate out the $\Delta$ channel information when the radar is in the acquisition mode. The 17.2 MHz $\Delta$ channel signals are passed via 17.2 MHz band pass filters 361L and 361H to summing amplifiers 355L and 355H wherein they are frequency multiplexed with the corresponding frequencies in the $\Sigma$ channel. Thus, the 60 MHz $\Sigma$ channel signal and the 17.2 MHz $\Delta$ channel signal derived from the 1180 MHz L-band signal are combined in summing amplifier 355L, while the 60 MHz $\Sigma$ channel signal and the 17.2 MHz $\Delta$ channel signal derived from the 1580 MHz·L-band signal are combined in summing amplifier 355H. Frequency multiplexing the $\Sigma$ and $\Delta$ information for each of the dual frequencies into common channels enables common processing of the $\Sigma$ and $\Delta$ information through wideband automatic gain control (AGC) circuitry, thereby minimizing the effects of relative phase and amplitude variations and minimizing errors in making elevation angle measurements.

The frequency multiplexed signals out of summing amplifiers 355L, 355H are passed to AGC amplifiers 362L, 362H which control the dynamic range of monopulse receiver 313. Referring now to FIG. 3C, the $\Sigma$ and $\Delta$ signals for each of the dual frequencies are separated by passing them through 60 MHz band pass filters 363L, 363H and 17.2 MHz band pass filters 364L, 364H, as shown. The $\Sigma$ and $\Delta$ signals are subsequently time multiplexed by means of passing the $\Delta$ channel signals through delay lines 365L, 365H. Time multiplexing permits common analog to digital (A/D) conversion of the Σ and Δ channel signals. It is here noted that delay lines 365L, 365H are dual delay lines, i.e., delay lines 365L, 365H provide both a 7.0 and 21.0 microsecond delay, the proper delay being selected by switches 366L, 366H, which are controlled by means of a signal provided by radar control unit 301 (FIG. 3). The reason for the dual delay is that a 7 microsecond range window is utilized in track modes and the system must be capable of tracking two targets in the same antenna beam dwell. Thus, if the range difference of the two tracked targets is less than 7.0 microseconds or 3500 feet, the 21.0 microsecond delay is used and the 7.0 microsecond delay line is selected for all other target range separations.

The Σ channel signals for each of the dual frequencies are downconverted to 17.2 MHz signals by being heterodyned in mixers 367L, 367H with the 42.8 MHz L.O. (4) signal from exciter 309 (FIG. 3A) to simplify the subsequent video detection processing. The 42.8 MHz L.O. (4) signal is applied to mixers 367L, 367H via switch 360 so that the A channel information may be gated out in the acquisition modes. The 17.2 MHz Σ and Δ channel signals for each of the dual frequencies are, after time multiplexing, combined together in summing amplifiers 368L, 368H.

Before proceeding with a description of the quadrature detection circuitry, it is noted that the 60 MHz Σ channel data in each of the frequency channels is applied to video detectors 369L, 369H. This pair of signals corresponds to Σ channel information at each of the two frequencies of the dual frequency transmission. In the surface mode of operation, as explained hereinabove, the two pulses transmitted contiguously have pulse widths of 4.1 and 0.1 microseconds, respectively; the former being used for long range, low resolution, and the latter being used for short range, high resolution. The output signals from video detectors 369L, 369H are applied to a switch 370 which is used to select either the short or long waveform in response to a control signal provided by radar control unit 301 (FIG. 3). Following switch 370 an envelope detector logarithmic amplifier circuit 371 is used, whose output is raw video data which is sent to display unit 319 (FIG. 3).

The time multiplexed Σ and Δ channel signals are applied to a pair of quadrature detection circuits 372L, 372H. It will be appreciated by those of skill in the art that quadrature detection circuits 372L, 372H include a pair of phase detectors (not shown) fed in phase quadrature by a 17.2 MHz reference signal obtained from exciter 309 (FIG. 3A). Also included (but not shown) in quadrature detection circuits 372L, 372H are low pass filters which remove L.O. and other higher order frequency components and DC amplifiers which are used for drive and gain scaling, all of which are of conventional design. The in phase (I) and quadrature phase (Q) components from quadrature detection circuits 372L, 372H are delayed with respect to each other by passing the Q component from quadrature detection circuit 372L through a 300 nanosecond delay line 373, and the I and Q components from phase detection circuit 372H through 700 nanosecond delay line 374, and 1.3 microsecond delay line 375, respectively. The time multiplexed I and Q signals are sent to signal processor 315 (FIG. 3) wherein they are digitized by a single A/D converter (not shown) prior to processing.

Figure 4:
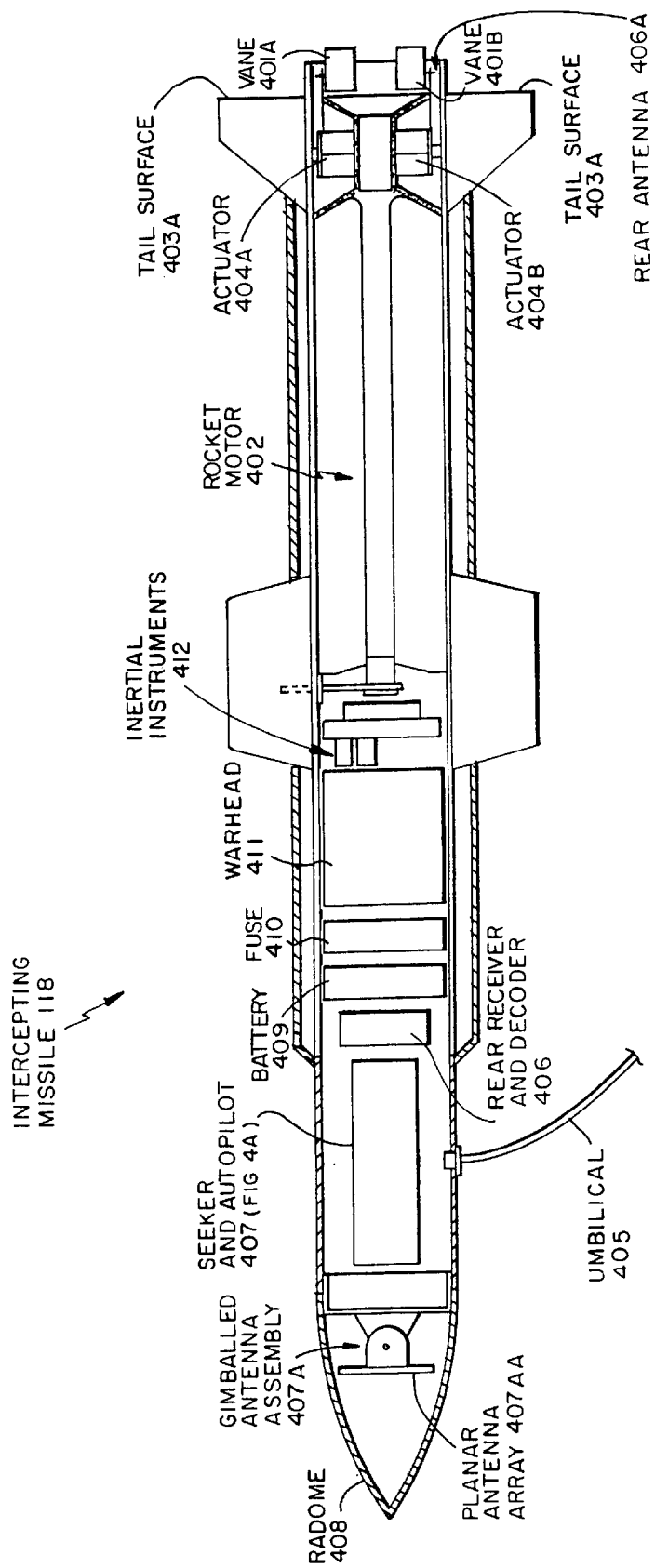
FIG. 4 is a generalized block diagram of an intercepting missile to be used in the contemplated system.

Referring now to FIG. 4, it will first be noted that several simplifications have been made in the interest of clarity. For example, the interconnections between the various components have not been shown nor have mechanical details such as mounting structures for the various components. With the foregoing in mind it will be observed that the intercepting missile 118 is here contemplated to be tail-controlled, either by means of vanes 401A, 401B in the exhaust of a rocket motor 402 or by tail surfaces 403A, 403B in accordance with control signals applied, respectively, to actuators 404A, 404B (it being understood that another pair of vanes, another pair of tail surfaces and another pair of actuators, none of which is shown, are mounted to make a cruciform control arrangement. The control signals to the actuators 404A, 404B are derived, prior to launch, through an umbilical 405 and, after launch, from a seeker and autopilot 407. Suffice it to say here that the seeker and autopilot 407 includes, inter alia, a pulse Doppler radar with a monopulse receiver for use during the terminal phase of flight. The rear receiver and decoder 406 is used during the midcourse phase of flight to derive target position signals transmitted from the naval vessel 100 (FIG. 1) to a rear antenna 406A. Ultimately, then, such signals are converted in the seeker and autopilot 407 to control signals for the actuators 404A, 404B and a gimballed antenna assembly 407A mounted within a radome 408. The latter then is actuated to direct the boresight line of a planar antenna array 407AA toward the attacking missile 108 (FIG. 1). (As noted hereinbefore, when the midcourse phase of the flight of the intercepting missile 118 is not to be carried out, the control signals for initially directing the planar antenna array 407AA are applied prior to launch through the umbilical 405.)

A battery 409, a fuze 110, a warhead 111 and inertial instruments 112, all of which here may be of any conventional construction, are also carried by the intercepting missile:118. It will now be obvious that the flight path of the intercepting missile 118 may be controlled.

Figure 4A:
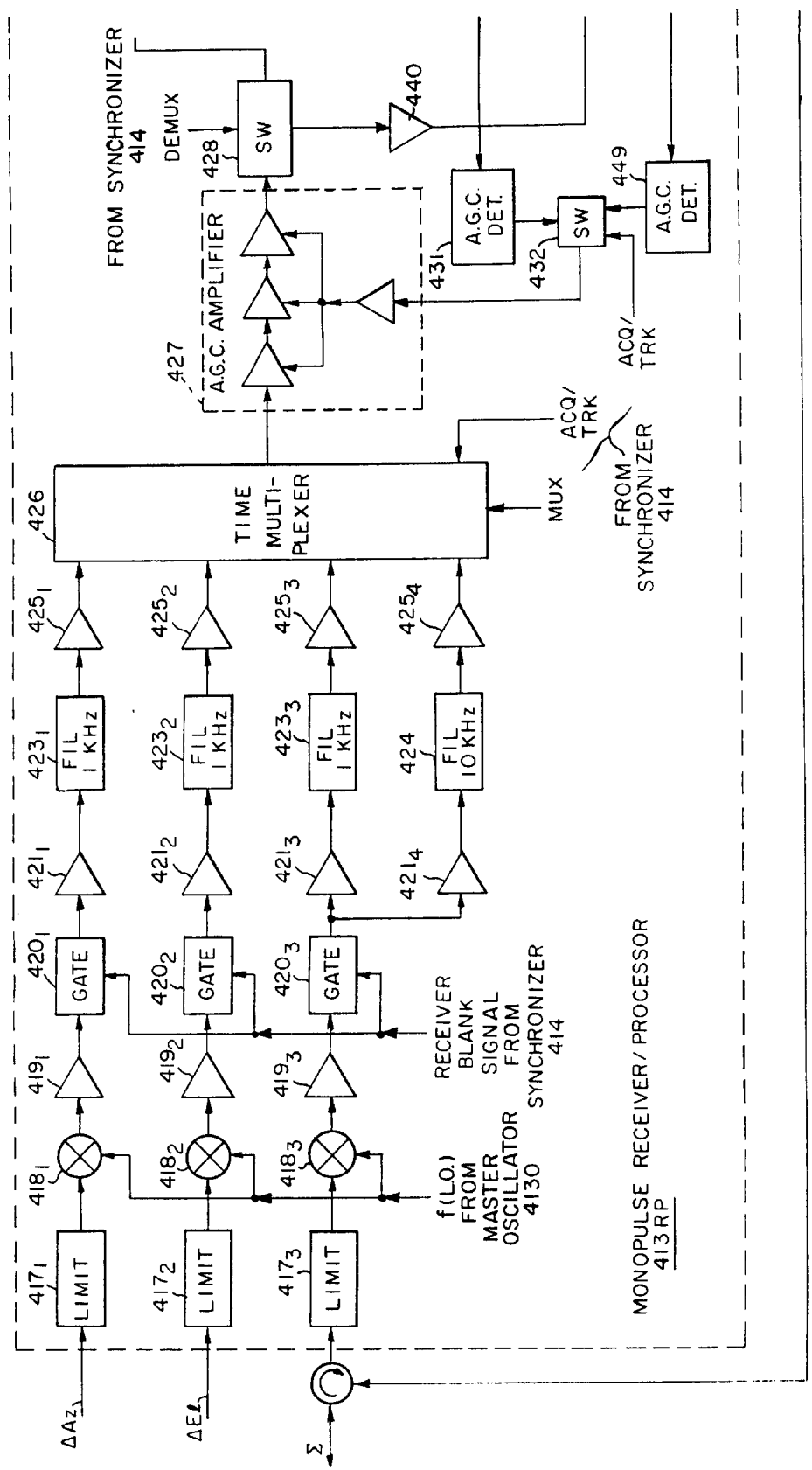
FIGS. 4A and 4B are a generalized block diagram of the seeker in the missile shown in FIG. 4 including a simplified block diagram of the receiver/processor used in such seeker.
Figure 4B:
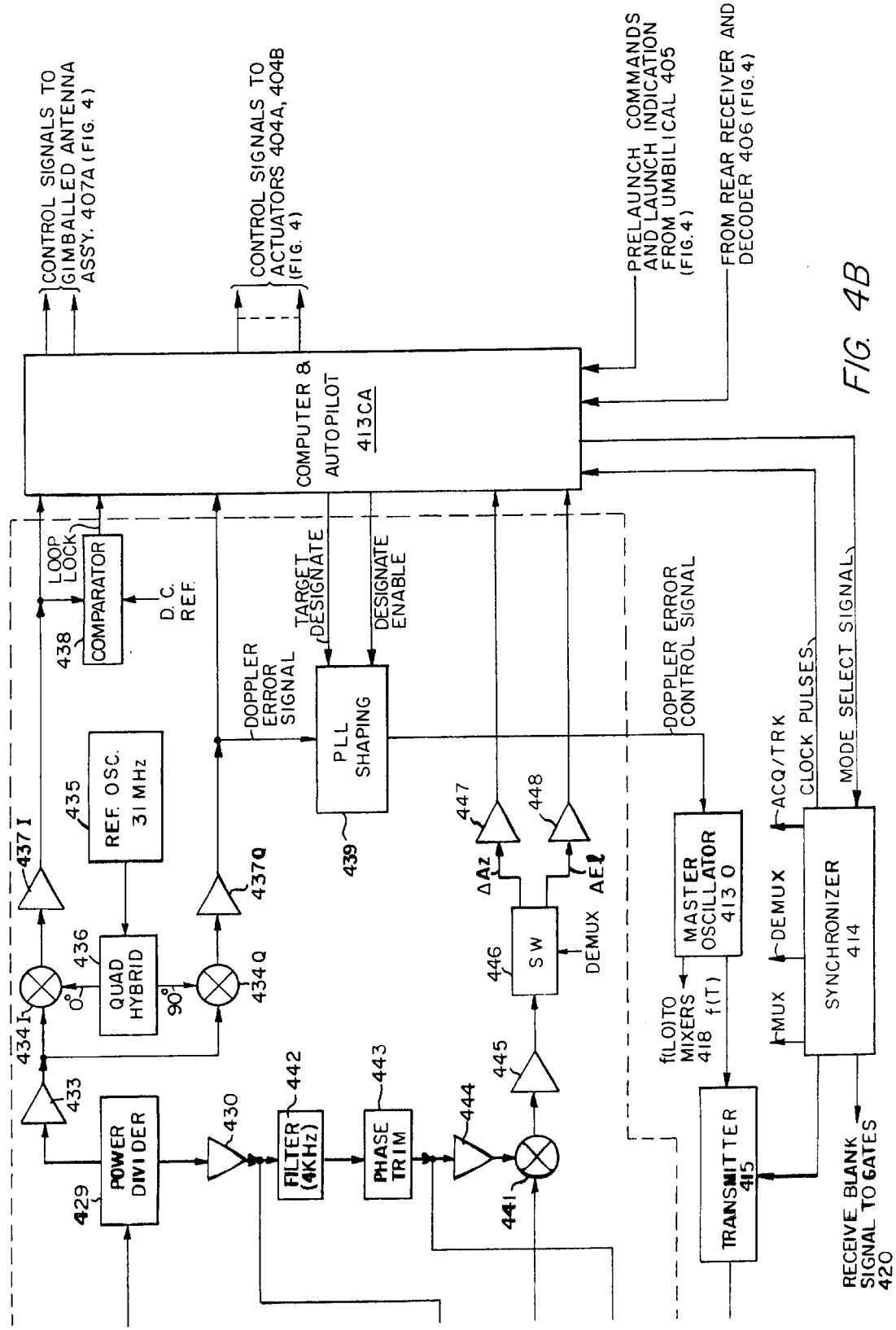

Referring now to FIGS. 4A and 4B, the major components of the seeker and autopilot 407 are seen generally to include a monopulse receiver/processor 413 RP, a master oscillator 413O, a computer and autopilot 413CA, a synchronizer 414, a transmitter 415 and a circulator 416. It will be recognized immediately by those of skill in the art that the enumerated major components connected together as shown constitute a pulse radar wherein the elements of the seeker and autopilot 407 correspond with the elements of known types of semiactive radar guidance systems. That is to say, the elements of seeker and autopilot 407 may be operated, if desired, during flight of the intercepting missile 118 (FIG. 1) as the missile-borne parts of a semiactive radar guidance system using signals derived through the rear receiver and decoder 406 (FIG. 4) from, for example, the radar antenna assembly 102 (FIG. 1) to derive the requisite control signals for the actuators 404A, 404B (FIG. 4), the gimballed antenna assembly 407A (FIG. 4) and the requisite control signals for the master oscillator 413O to carry out a successful intercept of a target such as the attacking missile 108 (FIG. 1).

Briefly, the monopulse receiver/processor 413RP here is responsive to a sum signal here derived in a conventional monopulse arithmetic unit, not shown, in the gimballed antenna assembly 407A (FIG. 4) and passed through the circulator 416 and two difference signals from that arithmetic unit. The three radio frequency signals just mentioned are designated in FIG. 4A as "Σ", "$\Delta A_z$", "$\Delta E_l$", meaning, respectively, the sum, azimuth difference and elevation difference signals.

The monopulse receiver processor 413RP passes the $\Delta A_z$, $\Delta E_l$ and Σ signals through limiters $417_1$, $417_2$ and $417_3$, respectively, to mixers $418_1$, $418_2$ and $418_3$ wherein they are heterodyned with a local oscillator signal (marked f(L.O.)) from master oscillator 413O and downconverted to 31 MHz intermediate frequency (IF) signals. Such IF signals are then amplified by amplifiers $419_1$, $419_2$ and $419_3$ and passed through blanking gates $420_1$, $420_2$ and $420_3$, which are controlled by a control signal from synchronizer 414 to gate off monopulse receiver processor 413RP when transmitter 415 is gated ON. The IF signals from blanking gates $420_1$, $420_2$ and $420_3$ are amplified by amplifiers $421_1$, $421_2$ and $421_3$ and then passed through narrow band (1 KHz) crystal filters $423_1$, $423_2$ and $423_3$. The Σ channel signal from blanking gate $420_3$ is shown to be split into two channels which hereinafter will be referred to as the "narrow band" (N.B.) Σ signal and the "wide band" (W.B.) Σ signal. The N.B. Σ signal is the one that is passed through the narrow band (1 KHz) crystal filter $423_3$. The W.B. Σ signal after being amplified in amplifier $422_4$ is passed through a wide band (10 KHz) crystal filter 424. After suitable amplification in amplifiers $425_1$, $425_2$ ... $425_4$ the filtered IF signals are applied to time multiplexer 426 wherein they are combined into a single channel, in response to a "MUX" signal from synchronizer 414.

Before proceeding, it is here noted that W.B. Σ signal is used during acquisition modes of the seeker and autopilot 407, while the N.B. Σ signal is used during the tracking mode. Further, master oscillator 4130 in addition to producing the local oscillator signal (f(L.O.)) also produces a signal marked f(T) for the transmitter 415. The frequency of the latter signal then differs (when a target such as the attacking missile 108 (FIG. 1) is being tracked) from the frequency of the local oscillator signal by an amount equal to the center frequency (here 31 MHz) of the IF channels in monopulse receiver/processor 413RP plus the Doppler shift due to the range rate between the attacking missile 108 (FIG. 1) and the intercepting missile 118 (FIG. 1). Such Doppler shift is automatically determined in monopulse receiver/processor 413RP in a manner to be described. Suffice it to say here that, when a target is being tracked, the frequency of the local oscillator signal, f(L.O.), is maintained at the proper frequency to compensate for any Doppler shift.

The multiplexed signals from time multiplexer 426 are passed through an AGC amplifier 427, which controls the dynamic range of monopulse receiver/processor 413RP, to a switch 428, which is shown to be controlled by a de-multiplex (DEMUX) signal from synchronizer 414. During an acquisition mode the switch 428 is effective to gate only the W.B. Σ signal to power divider 429. A first portion of the W.B. Σ signal from power divider 429 is shown to be applied via amplifier 430 to an AGC detector 431. The output signal from AGC detector 431 is passed via switch 432 to AGC amplifier 427, as shown. Switch 432 is controlled, in a manner to be described in greater detail hereinafter, by a control signal provided by synchronizer 414.

A second portion of the W.B. Σ signal from power divider 429 is passed via amplifier 433 to a quadrature demodulator (not numbered) comprising a so-called "in-phase" phase detector 434I and to a so-called "quadrature phase" phase detector 434Q. A pair of quadrature reference signals, obtained by passing the output signal from a 31 MHz reference oscillator 435 through a quadrature hybrid 436, is also applied to phase detectors 434I, 434Q, as shown. The output signals from phase detectors 434I, 434Q are sent via amplifiers 437I, 437Q to computer and autopilot 413CA. When a phase lock between the W.B. Σ signal and the 31 MHz reference signal from 31 MHz reference oscillator 435 is obtained, the output signal from phase detector 434I is at a maximum and, therefore, a portion of the output signal from phase detector 434I is applied to a comparator 438 which includes a low pass filter (not shown) to provide a loop lock indicator signal to computer and autopilot 413CA when the amplitude of the signal out of phase detector 437I exceeds that of a D.C. reference. Upon receipt of the loop lock indicator signal the computer and auto-pilot 413CA provides a DESIGNATE ENABLE signal to the loop shaping circuit 439. In the absence of a phase lock, the output signal from phase detector 434Q is an indication (in magnitude and sign) of the difference between the W.B. Σ signal and the 31 MHz reference signal, and is here referred to as the DOPPLER ERROR SIGNAL. The DOPPLER ERROR SIGNAL is shown to be applied to loop shaping circuit 439 along with other signals to be described to produce a DOPPLER ERROR CONTROL SIGNAL to master oscillator 4130 ultimately to change the local oscillator frequency, f(L.O.), until the DOPPLER ERROR SIGNAL is nulled. The details of the phase lock loop shaping circuit 439 will be explained in greater detail hereinafter, suffice it to say here that such circuitry is effective to expand the capture range of the phase lock loop such that it is not limited by the characteristics of phase detector 434Q.

While in the acquisition mode, the I and Q data from the quadrature demodulator (not numbered), which are here video signals having a 5 KHz bandwidth, are fed to a Fast Fourier Transform (FFT) spectrum analyzer (not shown) within the computer and autopilot 413CA. Such a spectrum analyzer, which as is known is analogous to a filter bank, determines the Doppler frequency of a target such as the aircraft 110 (FIG. 1) to a frequency resolution of 200 Hz. Computer and autopilot 413CA communicates its estimate of the target frequency, as obtained from the FFT spectrum analyzer (not shown), to the phase lock loop shaping circuitry 439 as a signal labeled TARGET DESIGNATE. The phase lock loop gain and shaping are such that the loop will lock to a target whose frequency is within 200 Hz of the designated frequency.

Simultaneously with the transmission of the TARGET DESIGNATE signal to the phase lock loop shaping circuitry 439, computer and autopilot 413CA transmits a MODE SELECT SIGNAL to synchronizer 414 which, in turn, generates an ACQ/TRK signal which is effective to switch seeker and autopilot 407 from an acquisition to a track mode. Such ACQ/TRK signal is shown to be applied to the time multiplexer 426 and the switch 432. In the track mode, time multiplexer 426 gates the N.B. Σ and Δ channel data through the AGC amplifier 427 to switch 428 in such a fashion that on every other clock pulse from the synchronizer 414 the N.B. Σ data, is presented. Thus, the first clock pulse corresponds to the N.B. Σ data and the fourth clock pulse corresponds to the $\Delta A_z$ data. The switch 428, in response to the DEMUX signal supplied by synchronizer 414, alternately passes the N.B. Σ channel data to power divider 429 and the Δ channel data to amplifier 440. The power divider 429 splits the N.B. Σ signal and sends a first portion of such signal to the quadrature demodulator (not numbered but described hereinabove) and a second portion to amplifier 430, as shown. The 31 MHz A channel data from amplifier 440 is shown to be applied to mixer 441 wherein it is downconverted to a suitable video frequency signal by being heterodyned with the N.B. Σ signal in a manner to be described. The N.B. Σ channel signal from amplifier 430 is passed through a 4 KHz crystal filter 442, a phase trimming network 443 and an amplifier 444 before being applied to mixer 441. It will now be appreciated by those of skill in the art that, as the N.B. Σ channel data from amplifier 430 is in the form of a pulse (due to the requisite time multiplexing and demultiplexing), when such data is passed through the 4 KHz crystal filter 442 a certain amount of ringing will occur. It is this pulse ringing which is effective to maintain the presence of the N.B. Σ signal at mixer 441 while the Δ channel data is being gated through switch 428. The phase trimming network 443 is provided to maintain the requisite phase balance (match) between the Σ and Δ channels. The Δ channel data from mixer 441 is passed via amplifier 445 to switch 446. The switch 446 is controlled by the DEMUX signals from synchronizer 414 and is effective to gate the $\Delta A_z$ data through amplifier 447 and the $\Delta E_l$ data through amplifier 448 to computer and autopilot 413CA wherein such data is converted to yaw and pitch error signals to derive the requisite control signals for the actuators 404A, 404B . . . (FIG. 4) and the gimballed antenna assembly° 407A (FIG. 4).

It is noted here in passing that in the track mode, the switch 432 is positioned such that the output signal from AGC detector 449 is used to control AGC amplifier 427. As the input signal to AGC detector 449 is obtained from phase trimming network 443 advantage is taken of the pulse ringing feature (described above) to present a continuous signal to AGC detector 449.

The just-described method for downconverting the Δ channel data offers an advantage over more conventional designs wherein a reference signal obtained from the phase lock loop reference oscillator (here master oscillator 4130) is used to downconvert the Δ channel data. Thus, in a changing environment wherein a "Velocity Gate Pull Off" (VGPO) type jammer can cause a phase lock loop to break lock, the reference oscillator would not be properly positioned to downconvert the Δ channel data, thereby giving rise to tracking errors or even resulting in a loss of track, whereas if in the herein-contemplated design the N.B. Σ channel signal is used to downconvert the Δ channel data, no such distortion or loss of track can result.

Figure 4C:
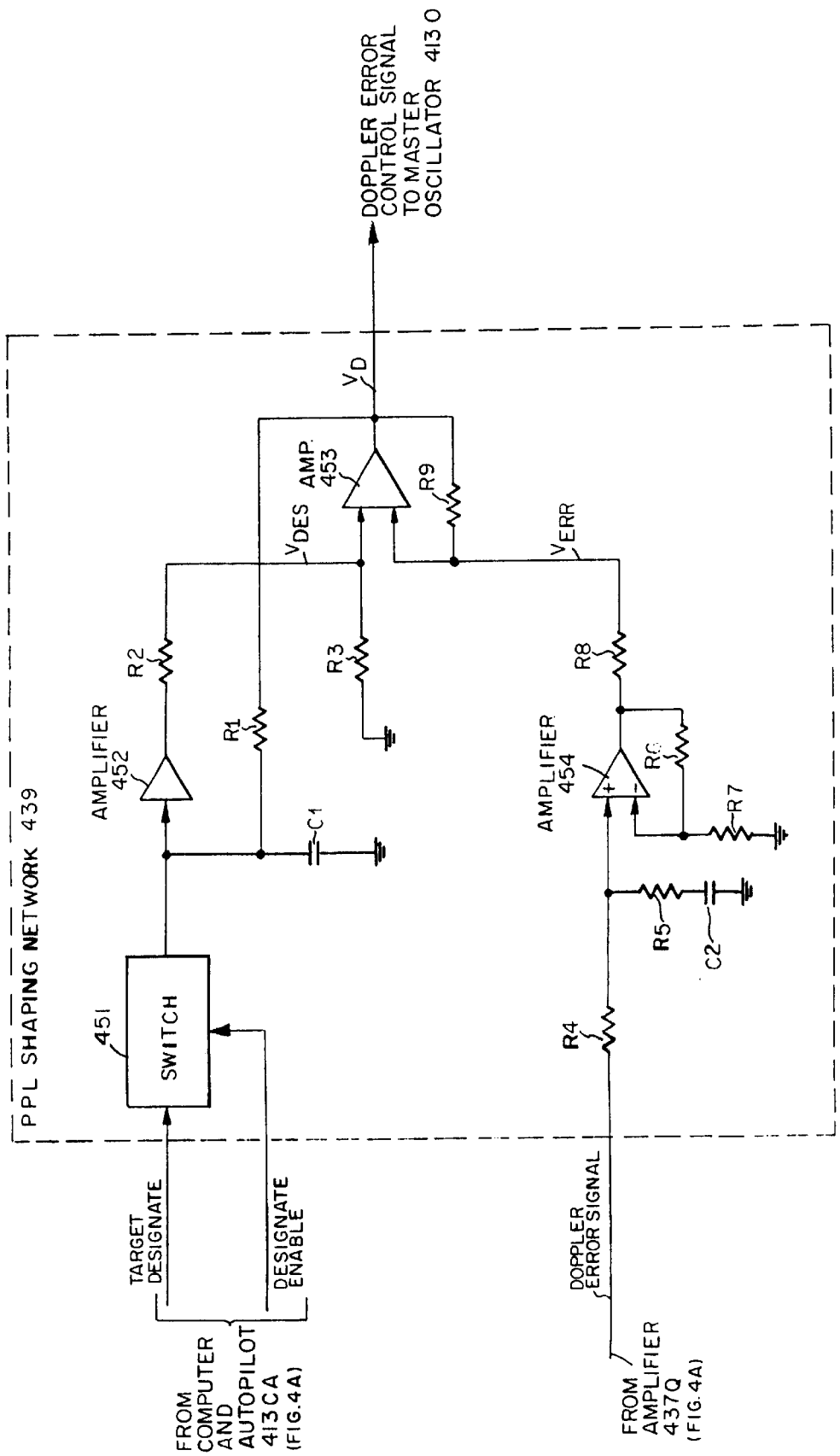
FIG. 4C is a simplified block diagram of the phase lock loop shaping network used in the receiver/processor shown in FIGS. 4A and 4B.

Referring now to FIG. 4C, the phase lock loop shaping network 439 is shown to receive both a TARGET DESIGNATE and a DESIGNATE ENABLE signal from computer and autopilot 413CA. The TARGET DESIGNATE signal is a voltage initially representative of the expected Doppler frequency of a target such as the aircraft 110 (FIG. 1) as computed by radar control unit 301. (FIG. 3). Such signal is supplied to seeker and autopilot 407 (FIG. 4A) via umbilical 405 prior to missile launch. The TARGET DESIGNATE signal is then updated by a signal derived in a FET spectrum analyzer (not shown) within computer and autopilot 413CA (FIG. 4A) and is effective to position the phase lock loop (not numbered but shown in FIG. 4A) to within 200 Hz of the Doppler frequency of the target. The TARGET DESIGNATE signal is shown to be applied via a switch 451 to an amplifier 452 and a storage capacitor C1. The switch 451 is controlled by the DESIGNATE ENABLE signal, which is effective to open the switch 451 once computer and autopilot 413CA receives the loop lock indicator signal from the comparator 438 (FIG. 4B).

The output signal from amplifier 452 is passed via a voltage divider comprising resistors R2 and R3 to amplifier 453. The values of R2 and R3 are chosen to offset the gain of amplifier 453 which is determined by feedback resistors R1 and R9. The gain through amplifier 452 and resistor R2 is unity and, therefore, the voltage $V_{DES}$ appearing at amplifier 453 is identical to that stored in storage capacitor C1. The second input signal to amplifier 453 is the DOPPLER ERROR SIGNAL obtained from phase detector 434Q (FIG. 4) via amplifier 437Q (FIG. 4).

The DOPPLER ERROR SIGNAL is shown to be passed via resistors R4 and R5 to storage capacitor C2 and to amplifier 454. A feedback voltage is provided to amplifier 454 from the junction of resistors R6 and R7. Again, the gain through amplifier 454 and resistor R8 is unity and, therefore, the voltage VERR appearing at amplifier 453 is identical to that stored in storage capacitor C2. Amplifier 453 provides an output voltage VD (or DOPPLER ERROR CONTROL SIGNAL) which is the algebraic sum of the two input voltages VDES and VERRI to the master oscillator 4130 (FIG. 4A) to change the local oscillator frequency, f(L.O.), ultimately to null the DOPPLER ERROR SIGNAL.

It will now be seen that because of resistor R1 between the output of amplifier 453 and storage capacitor C1, any voltage difference between such points will cause a current to flow through R1 until equilibrium between these points is realized. Once the DESIGNATE ENABLE voltage is applied to switch 451 an inner loop is formed within loop shaping network 439 by means of resistor R1. The inner loop so formed forces phase detector 434Q to operate about its null (zero volts output) point.

Figure 5:
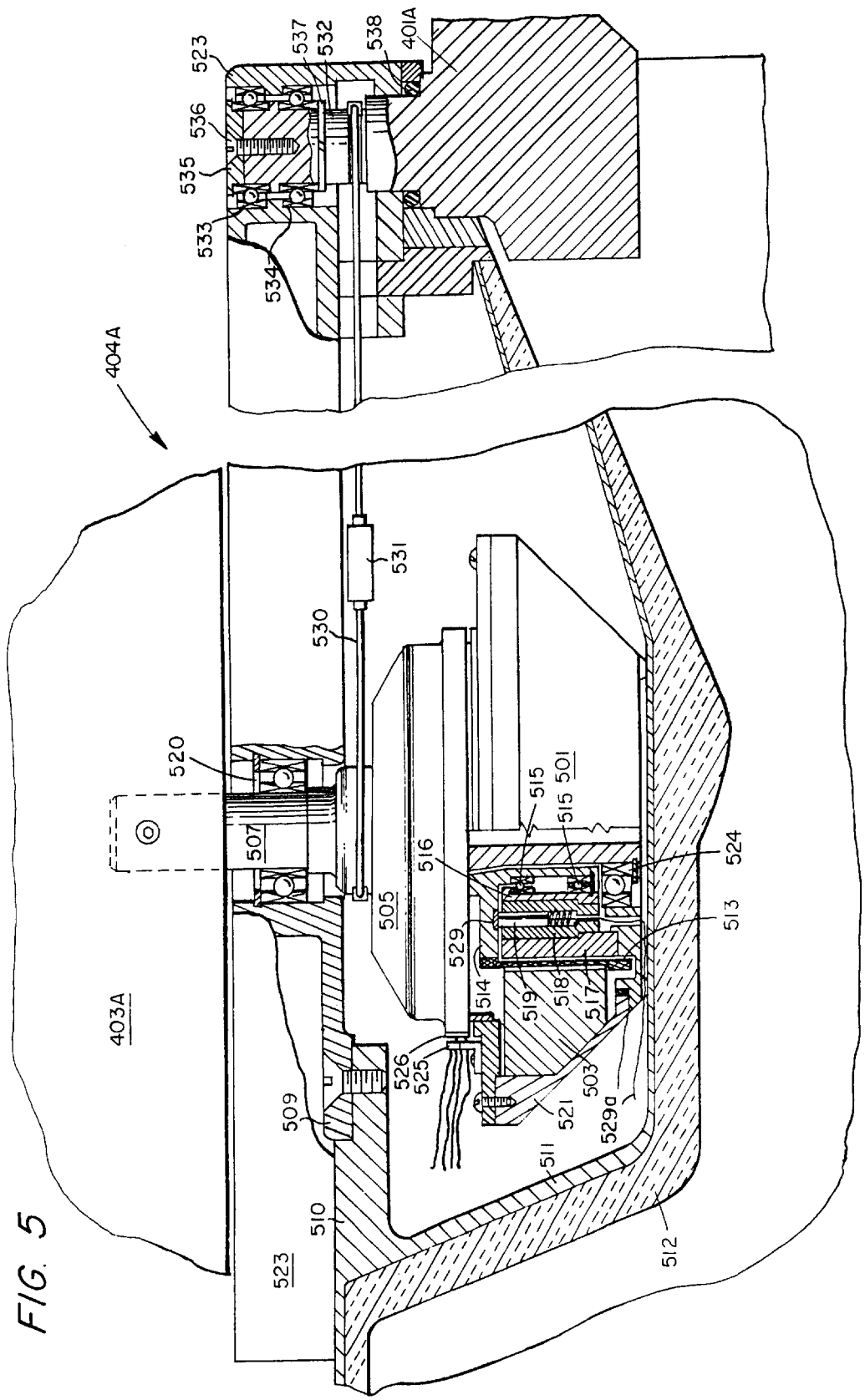
FIGS. 5 and 5A are views showing how the contemplated actuators are arranged in the missile and elements of such actuators.

Referring now to FIG. 5, actuator 404A is shown to include a basket rotor motor 501, a permanent magnet field assembly 503, a harmonic drive gear train 505 (or reduction gear) and a tail surface shaft 507, all of which are integrally mounted and supported, as shown. The actuator 404A is bolted to a plate 509 which forms a quarter section of the tail section of the intercepting missile 118 (FIG. 4). The plate 509, which is bolted to the missile skin 510, has mounted on it a support member 523 which will be described in greater detail hereinafter. The actuator 404A is concentrically packaged in the annulus between the inner diameter of the missile skin 510 and the outer diameter of the rocket motor exhaust tube 511 and, therefore, the overall height of the actuator 404A is kept to a minimum to avoid undesired protuberances in the missile skin 510. A layer of thermal insulation 512 is provided, as shown, on the rocket motor exhaust tube 511 to prevent damage to the exhaust tube 511. The thermal insulation 512 is shown to have a protrusion (not numbered) formed therein, such protrusion forming a nozzle in the rocket motor exhaust tube 511.

The basket rotor motor 501 is shown to be packaged within an aluminum housing 521 which is bolted to the plate 509. The basket rotor motor 501 utilizes a low inertia, high torque basket rotor 513, which is supported by an integral hollow shaft 514, which, in turn, is supported by two high speed bearings 515. The bearings 515 are supported in an internal, stationary composite structure (not numbered) which includes a high strength steel tube 516 that supports the outer races (not numbered) of the bearings 515. The stationary composite structure (not numbered) is surrounded by a concentric cylinder 517 of a material, here magnetic steel, having a high magnetic permeability and having a high magnetic saturation flux density. Thus, cylinder 517 provides a magnetic return path and completes the magnetic path between the motor poles (not shown) through the air gap (not numbered) and the basket rotor 513. A coaxial brush assembly 519, which is packaged in a phenolic ring 518, is located concentrically between the cylinder 517 and the steel tube 516.

The actual length of the motor 501 is reduced without reducing the effective motor length by means of folding the end turns (not numbered) at each end of the basket rotor 513. The ends are folded up at the open end and down at the supported end of the basket rotor 513. The use of the basket rotor 513 permits the utilization of the space internal to the basket rotor 513 for purposes other than magnetic return as is the case with conventional motors. Thus, the spring loaded coaxial brush assembly 519 and a commutator 529 are contained within the basket rotor 513, as shown. The requisite electrical contact to commutator 529 is provided by means of a wire 529a which is shown to extend from brush assembly 519 through a hole (not numbered) provided in the phenolic ring 518, finally to exit at a hole (not numbered) provided on the bottom of basket rotor motor 501. Wire 529a is terminated at a drive amplifier (not shown).

The harmonic drive gear train 505, which is here a part No. 7319020, purchased from United Shoe Machinery Corp., ICON Division, Woburn, Mass. provides the high reduction ratio between the motor 501 and the tail fin shaft 507. Briefly, the harmonic drive gear train assembly 505 comprises three basic components (none of which are shown), namely a wave generator, a circular spline and a dynamic spline. The wave generator is an elliptical hollow plug of titanium onto which a special bearing having a flexible outer race is pressed. A flexible spline is pressed over the bearing outer race. The wave generator couples to the motor 501 and serves to convert rotation of the motor into a corresponding elliptical motion of the flex spline. The circular spline is an internal spline that is fixed to the housing 521 and serves to transfer the loads induced in the flex spline to the housing 521. The dynamic spline is a movable internal spline which is rigidly connected to the tail fin shaft 507. The requisite reduction ratio is determined by the number of teeth in the dynamic spline as compared with the number of teeth in the flex spline.

The tail fin shaft 507 is supported on the fin end by a duplex ball bearing set 520 which transfers the shear loads due to aerodynamic loading of the tail surface 403A through the support member 523 and the plate 509 to the missile skin 510. It is noted here in passing that, while a single duplex ball bearing set has been shown for the purposes of clarity, in actual practice a pair of duplex ball bearing sets is used. The duplex ball bearing set 520 also absorbs the axial thrust loads on the shaft 507 due to maneuvering of the intercepting missile 118 (FIG. 4). A second ball bearing set 524 at the bottom of the tail fin shaft 507 reacts to the bending moment loads on the tail fin shaft 507 created by the aerodynamic wind load on the tail surface end in order to absorb the stresses induced by the high aerodynamic loads on the tail surface 403A. The tail fin shaft 507 is reduced in diameter at the lower end because of the reduced stress concentrations in this area, thereby allowing the tail fin shaft 507 to pass through the basket rotor motor 501. The tail fin shaft 507 is isolated from the basket rotor motor 501 so as to not introduce tail surface moments into the motor rotor bearings 515. The tail surface 403A is attached to the tail fin shaft 507 in any convenient manner, here by means of a locking pin (not numbered).

A feedback element (not numbered), which comprises a circular arc plastic potentiometer 525 (sometimes hereinafter referred to simply as potentiometer 525) and a wiper 526 is included to provide positional information in order to control the actuator 404A. The wiper 526 is mounted to the flex spline (not numbered) and the potentiometer 525 is mounted to the actuator housing 521, as shown. The potentiometer 525 has two tracks (not shown), the first one of which is a resistive element having a center tap and two end taps. The center tap is grounded, while positive voltage is applied to one of the end taps and a negative voltage is applied to the remaining end tap. The second track on potentiometer 525 is a continuous strip of metal. The wiper 526 includes two arms (not numbered) which are electrically connected together. The first arm of wiper 526 contacts the resistive track (not shown) on potentiometer 525 and receives a voltage which is proportional to the position angle of the tail fin shaft 507. The sign of the voltage gives the directional relationship with respect to the zero position of the tail fin shaft 507. The second arm of wiper 526 transfers this voltage via the second track of potentiometer 525, which is the continuous strip of metal, to a pick-off terminal (not numbered) provided on the potentio-meter 525.

The tail fin shaft 507 is also shown to have mounted to it a drive cable 530 which is connected via a turnbuckle 531 to the shaft 532 supporting the vane 401A. The shaft 532 is mounted via a pair of duplex ball bearings 533, 534 to the support member 523. An end cap 535, which is shown to be attached to the shaft 532 by means of a screw 536, is provided to retain the races of the duplex ball bearings 533. A shoulder 537 is provided on the shaft 532 to retain the races of the duplex ball bearings 534. A seal between vane 401A and the support member 523 is provided by means of a channel (not numbered) formed in the support member 523. Such channel is then filled with an "O" ring 538 to form a hot gas resistant seal.

The drive cable 530 between the shafts 507 and 532 here provides a direct one-for-one mechanical linkage between such shafts. Thus, for example, a command from the seeker and autopilot 407 (FIG. 4A) to actuator 404A to rotate the missile tail 403A, say 10°, would result in a corresponding 10° rotation of the vane 401A. It will now be appreciated that the vanes 401A, 401B (FIG. 4) in the exhaust of the rocket motor 402 (FIG. 4) (it being understood that another pair of vanes is provided to make a cruciform control arrangement) are effective to provide the requisite control forces to initially control the flight of the intercepting missile 118 (FIG. 4) until such time as the intercepting missile 118 (FIG. 4) attains sufficient velocity for the tail surfaces 403A, 403B (FIG. 4) to become effective. The vanes 401A, 401B are here designed to ablate so that when the flight of intercepting missile 118 (FIG. 4) is being controlled by tail surfaces 403A, 403B (FIG. 4) little, if any, of the vanes 401A, 401B (FIG. 4) remains.

Figure 5A:
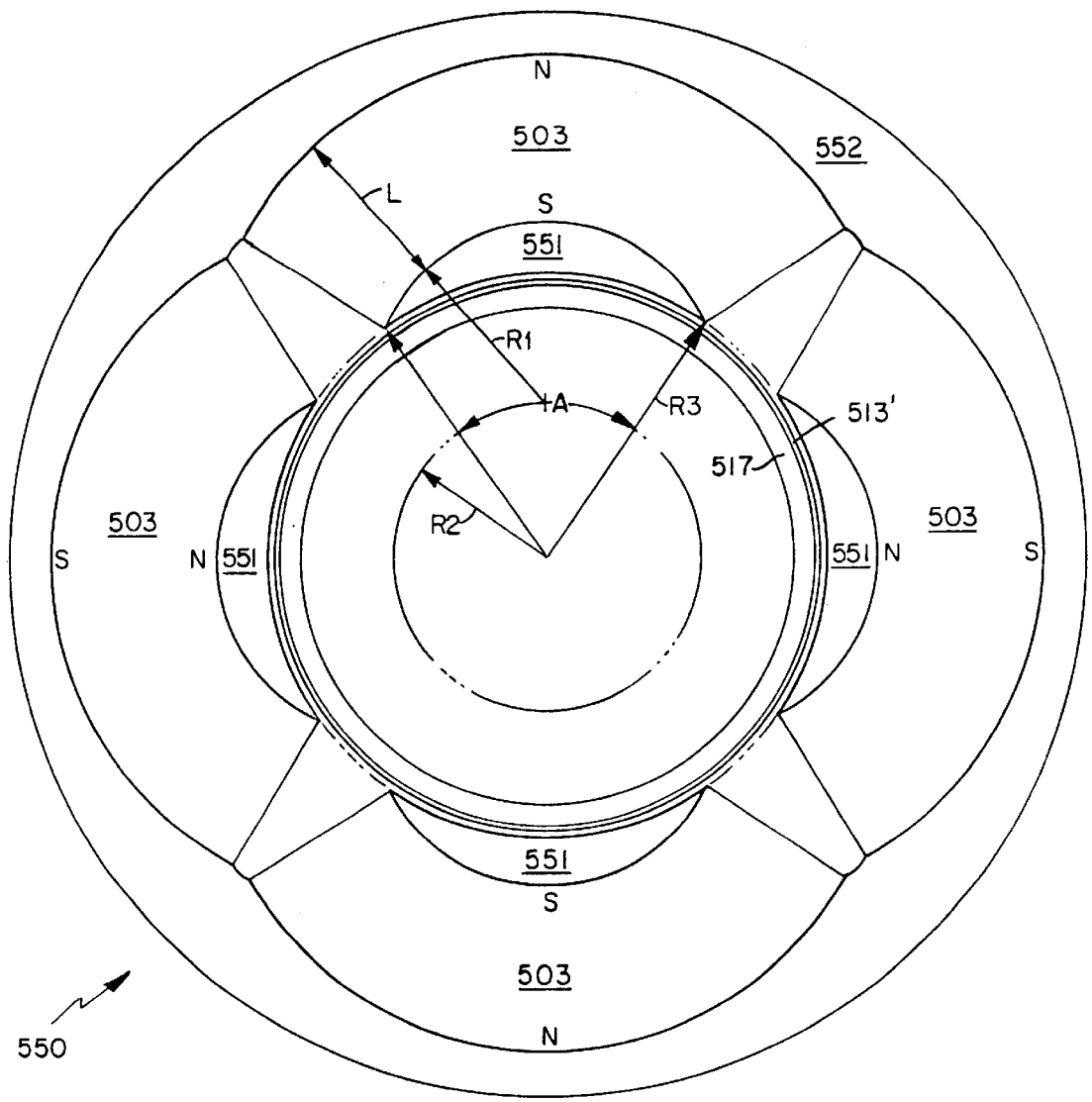

Referring now to FIG. 5A, the permanent magnetic field structure 550 of the basket rotor motor 401 (FIG. 5) here is shown to include four radially fluxed, circular arc permanent magnets 503 (hereinafter referred to simply as magnets 503). It is noted in passing that while magnets 503 are shown to be solid pieces, they could as well be laminated. The magnets 503 are made of samarium cobalt and are in the form of a sector of an annular cylinder. Such magnets are a product of Raytheon Microwave and Power Tube Division, Waltham, Mass. The center of each sector lies on the circumference of a circle of radius R2 from the center of the field structure 550. Pole pieces 551 are shown to be bonded, in any conventional manner, to the inner surface of permanent magnets 503. Each of pole pieces 551 is crescent-shaped, having an outer radius of R1 (the radius of the inner surface of the magnet sector) and an inner radius R3 (to overlie the basket rotor motor 501 (FIG. 5)). Each of pole pieces 503 subtends an angle A at the center of the field structure 550 and is fabricated from a material having a high permeability.

It is noted here in passing that, while the permanent magnetic field structure 550 is shown to include four permanent magnets 503, in practice the actual number of magnets can be any even number, depending on the motor speed and torque required. Adjacent ones of the magnets 503 are oppositely polarized and each of the magnets 503 is bonded to a common housing 552 of a magnetic material, here magnetic steel, which supports the permanent magnets 503 and acts as a return path for the magnetic field between adjacent ones of the permanent magnets 503. The magnetic circuit is completed by the concentric cylinder 517 (FIG. 5A).

If R2 is made equal to zero so that R1=R3 there would be no pole pieces 551 and, under ideal conditions, the flux density in the air gap between the permanent magnets 503 and the motor rotor 513' (FIG. 5A)would be given by:

$$Bg = \frac{Am\ Bm}{Ag} = Bm \qquad \text{Eq. (1)}$$

where:
Bg–flux density in air gap(gauss)
Bm=flux density of magnet 503(gauss)
Am=area of magnet 503 (cm²)
Ag=area of air gap (cm²)

Since an air gap is necessary for motor operation, the magnets 503 cannot operate at their remanent flux density but must operate at some lower level determined by the intersection of the air gap line and the demagnetization curve of the magnets 503. An additional loss of flux in the air gap is attributable to high magnetic leakage. As is known, the use of an iron pole piece has the effect of increasing the area of the magnet (Am) and, therefore, by making Am larger than the area of the air gap (Ag), air gap flux densities in excess of the remanent flux density of the magnets 503 are theoretically possible.

Experiments conducted on a pair of magnets of constant diameter indicated that for a constant air gap, as the magnet length (L) is reduced, the flux density in the air gap drops off at a faster rate than that which would occur if only the demagnetizing curve of the magnet and its intersection with the air gap line were considered. The rapid drop off in air gap flux density is attributable to low reluctance leakage paths that exist around the magnet, i.e. from one face, over the edges of the magnet to the face of the opposite polarity. If iron pole pieces are added to the magnets the leakage is even more pronounced since iron is a magnetically isotropic material and allows flux to emanate from the sides of the pole piece, resulting in a corresponding decrease in the flux in the air gap.

In the herein contemplated magnetic field structure 550 the flux density in the air gap is optimized through the use of the crescent-shaped pole pieces 551 as the sides (in the depth dimension) of the pole pieces 551 are eliminated. Eliminating the sides of the pole pieces 551 increases the length of the leakage paths (because the magnets 503 are anisotropic) and also increases the leakage path reluctance (because the leakage surface area is reduced). Thus, by configuring the magnets 503 in a circular arc of a radius that is smaller than the radius of the basket rotor motor 501 (FIG. 5), the magnets 503 tend to shield their pole pieces 551, thereby reducing the effect of magnetic leakage paths and producing a higher flux density in the air gap between the basket rotor 513 (FIG. 5) and the magnets 503.

The magnetic field structure 550 is also shown to include the concentric cylinder 517 with windings 513' appropriately disposed between the pole pieces 551 and the concentric cylinder 517. As mentioned hereinabove, concentric cylinder 517 is here made of magnetic steel and has a high magnetic permeability. The concentric cylinder 517 thus provides a magnetic return path allowing flux to flow from one pole piece 551 through the windings 513' and the concentric cylinder 517 to an adjacent pole piece 551.

Referring now to FIG. 6, missile launching station 106 is shown to include a number, here 24, of missile canisters $600_1, 600_2 \ldots 600_{24}$ arranged, as shown, such that missile canisters $600_1$ to $600_{12}$ are on the starboard side of naval vessel 100 (FIG. 1) and missile canisters $600_{13}$ to $600_{24}$ are on the port side. Each of the missile canisters $600_1, 600_2 \ldots 600_{24}$ contains a missile (not shown) mounted on a pneumatic ejection launcher (also not shown, but to be described in detail hereinafter with reference to FIG. 6A). The missile canisters $600_1, 600_2 \ldots 600_{24}$ are shown to receive command signals, here the MISSILE SELECT, FLIGHT MODE, INITIAL HEADING, and LAUNCH signals, from radar control unit 301 (FIG. 3) via cables 603, 604, junction box 602 and cable 601. The junction box 602 is included or purposes of installation ease, so that cables are not required to be routed from the port to starboard sides of naval vessel 100 (FIG. 1). It is noted here in passing that, while interconnections are shown to be made only between cables 603, 604 and the inboard ones of the missile canisters $600_1, 600_2 \ldots 600_{24}$, in practice each of the starboard missile canisters $600_1$ to $600_{12}$ are connected to cable 604 and each of the port missile canisters $600_{13}$ to $600_{24}$ are connected to cable 603. Again, to reduce the requisite amount of cabling between the missile canisters $600_1, 600_2 \ldots 600_{24}$ and the radar control unit 301 (FIG. 3), the identical command and heading signals are sent to each of the missile canisters $600_1, 600_2 \ldots 600_{24}$. However, the MISSILE SELECT signal from radar control unit 301 (FIG. 3) is encoded in such a manner that only the rear receiver and decoder 406 (FIG. 4) of the desired missile will respond. The radar control unit 301 (FIG. 3) also supplies, via cables (not shown), an analog firing signal to the selected one of the missile canisters; such firing signal is effective to ignite an explosive bolt (not shown but to be described hereinafter with reference to FIG. 6A) located on the pneumatic ejection launcher (also not shown).

Referring now to FIG. 6A, an exemplary missile canisters, here missile cannister $600_1$, is shown to include a missile 610 and a pneumatic ejection launcher 611 (hereinafter referred to simply as launcher 611). Positioned between the missile 610 and the launcher 611 is a guide rail 612, which has a slot (not shown) formed in the center thereof for reasons which will be explained hereinbelow. The sides of the guide rail 612 have "C-shaped" slots (not shown) formed therein for engaging corresponding guide arms (also not shown) provided on the missile 610.

The pneumatic ejection launcher 611 is shown to include a hollow metal cylinder 613, a piston 614, an energy absorber 615 and a fill block 616. The fill block 616 is an annular-shaped block of metal, here steel, having a fill port 617 and an exhaust port 618 formed therein. The fill port 617 is connected via a valve (not shown) to an air compressor (also not shown) onboard the naval vessel 100 (FIG. 1). An "O" ring seal 619 is provided, as shown, between the fill block 616 and the piston 614. A second "O" ring seal 620 is provided between the metal cylinder 613 and the fill block 616 and-is compressed by means of bolts (not shown) connecting the metal cylinder 613 to the fill block 616. An explosive bolt 621, which is here a Model No. 10630-1 from HOLEX, Inc., 2751 San Juan Road, Hollister, Calif. 95023, is mounted, as shown, to the fill block 616. The explosive bolt 621 is threaded into a tapped hole (not numbered) in the fill block 616. The fill block 616 is mounted, in any conventional manner, as by means of bolts (not shown), to a pedestal 622 thereby compressing an "O" ring seal 623 provided, as shown, between the fill block 616 and the pedestal 622.

A thrust link 624, which extends through a slot (not numbered) provided in both the metal cylinder 613 and the guide rail 612, for engaging a buttress 625 provided on the missile 610 is located on the top of the piston 614. A spring loaded pin (not shown), which engages the thrust link 624, is also provided in the top of the piston 614, for reasons which will be explained in detail hereinafter.

In operation, the piston 614 is placed against the fill block 616 and held in place by means of the explosive bolt 621, which also compresses the "O" ring seal 619. The missile 610 is placed on the guide rail 612 and slid toward the bottom of the missile canister 600₁ until the buttress 625 on the missile 610 contacts the thrust link 624. The valve (not shown), which is connected between the fill port 617 and the air compressor (also not shown), is opened and the piston 614 is charged. Upon receipt of a fire signal from the radar control unit 301 (FIG. 3), the explosive bolt 621 is severed at the break line 626 thereby releasing the piston 614 and the missile 610. The reaction force of the compressed air expanding from the piston 614 into the metal cylinder 613 accelerates the piston 614 and the missile 610 forward. A pair of low friction wear rings 62, is provided on each end of the piston 614, which allows the piston 614 to move freely inside the cylinder. An additional "O" ring (not numbered) is provided between the bottom pair of low friction wear rings 627. At the end of the piston stroke, the piston head (not numbered) impacts the energy absorber 615, which is here a block of lead. The energy absorber 615 has a channel (not numbered) provided therein for receiving the thrust link 624 which is rotatably mounted in the piston 614. Once the thrust link 624 is forced within the channel (not numbered) in the energy absorber 615, the spring loaded pin (not shown) within the piston 614 is released and retains the thrust link 624 in the channel (not numbered) to prevent possible damage to the missile 610. As the energy absorber 615 is compressed, the piston 614 is stopped and the residual pressure in the cylinder 613 is bled off via the exhaust port 618.

The missile canister 600₁ is prepared for reuse by removing the now compressed energy absorber 615 and the expended explosive bolt 621 from the pneumatic ejection launcher 611 and replacing them with new parts. The frangible cover 627 on top of the missile canister 600₁ is then replaced. It is noted here in passing that the sides (not numbered) of the missile canister 600₁ are fabricated from a honeycomb aluminum material in order to reduce the weight of the missile canister 600₁, and that the pneumatic ejection launcher 611 is rigidly affixed to one side of the canister by means of bolts (not shown). Thus, with a second cover (not shown) placed on the bottom of the missile canister 600₁, a certified round including the missile 610 and pneumatic ejection launcher 611 is thereby formed for shipping and storage purposes.

From the foregoing, it will be apparent to one of skill in the art that a point defense system according to this invention need not be limited to its disclosed embodiment but may be deemed to include any shipboard point defense system utilizing any chosen radar system to detect and track both airborne and surface targets and to direct a vertically launched missile to intercept such targets. Further, it will be apparent that mechanical details of the various novel elements disclosed may be changed without departing from the inventive concepts disclosed and described. It is felt, therefore, that this invention should not be restricted to its disclosed embodiment but rather should be limited only by the spirit and scope of the appended claims.

What is claimed is:

1. In a guided missile having a rocket motor disposed within the body of such missile to provide forward thrust and a control surface assembly, consisting of a set of movable vanes in the jet stream of the rocket motor and a like set of movable aerodynamic control surfaces outside the body of such missile, each one of both such sets being affixed to a different shaft rotatably mounted in the body of such missile, actuators for the control surface assembly, each one of such actuators comprising:

(a) an electric motor disposed within the body of the guided missile about the shaft affixed to the movable aerodynamic control surface;

(b) a reduction gear also disposed within the body of the guided missile about the shaft affixed to the movable aerodynamic control surface, such gear being connected between the electric motor and such shaft;

(c) pulley means disposed within the body of the guided missile to connect such shaft and the shaft supporting a corresponding one of the set of movable vanes; and (d) means for actuating the electric motor.

2. An actuator as in claim 1 wherein the electric motor is a D.C. motor.

3. The actuator as in claim 2 wherein the stator of the electric motor comprises:

(a) a single inner ring fabricated from a material having a high permeance;

(b) a composite outer ring, consisting of an even plurality of arcuate pole pieces with alternate ones radially magnetized in the same direction, each one of such pole pieces consisting of a permanent magnet radially magnetized and a crescent-shaped shoe of a material having a high permeance to form a magnetic gap with the single inner ring, the magnetic flux in such gap being concentrated under the crescent-shaped shoe;

(c) a shell overlying one end of the magnetic gap and portions of the single inner ring and the composite outer ring, such shell being fabricated from a material having a high permeance.

4. An actuator as in claim 3 wherein the material of the arcuate pole pieces is samarium cobalt.

5. The actuator as in claim 4 wherein the active turns of the rotor of the electric motor are disposed within the magnetic gap.

6. The actuator as in claim 5 wherein the rotor of the electric motor includes a plurality of windings energized through a like plurality of commutators.

* * * * *

UNITED STATES PATENT AND TRADEMARK OFFICE
CERTIFICATE OF CORRECTION

PATENT NO. : 6,543,716 B1
DATED : April 8, 2003
INVENTOR(S) : Vernon W. Miller et al.

It is certified that error appears in the above-identified patent and that said Letters Patent is hereby corrected as shown below:

Column 3,
Line 38, delete "crosssections" and replace with -- cross-sections --.

Column 5,
Line 29, delete "WAVE FORM" and replace with -- WAVEFORM --.
Lines 42 and 59, delete "SA" and replace with -- 5A --.

Column 6,
Line 10, delete "IA" and replace with -- 1A --.
Line 50, delete "burst#" and replace with -- burst, --.

Column 7,
Line 29, delete "per cent" and replace with -- percent --.

Column 9,
Line 54, delete "40°" and replace with -- 4° --.

Column 14,
Line 5, delete "IL" and replace with -- L --.
Line 22, delete "35311" and replace with -- 353H --.

Column 15,
Line 20, delete "A" and replace with -- Δ --.

Column 16,
Line 31, delete "missile:118" and replace with -- missile 118 --.

Column 17,
Line 14, delete "$422_4$" and replace with -- $421_4$ --.

Column 19,
Line 41, delete "301.(FIG3)." and replace with -- 301 (FIG 3). --.

Column 20,
Line 3, delete "VERR" and replace with -- V$_{ERR}$ --.
Line 5, delete "VD" and replace with -- $V_D$ --.
Line 7, delete "VDES and VERRI" and replace with -- V$_{DES}$ AND V$_{ERR}$ --.

Column 22,
Line 5, delete "potentio-meter" and replace with -- potentiometer --.

UNITED STATES PATENT AND TRADEMARK OFFICE
CERTIFICATE OF CORRECTION

PATENT NO. : 6,543,716 B1
DATED : April 8, 2003
INVENTOR(S) : Vernon W. Miller et al.

It is certified that error appears in the above-identified patent and that said Letters Patent is hereby corrected as shown below:

Column 24,
Line 2, delete "60024" and replace with -- $600_{24}$ --.
Line 52, delete "and-is" and replace with -- and is --.

Column 25,
Line 17, delete "62" and replace with -- 627 --.

Column 26,
Line 42, delete "shoe;" and replace with -- shoe; and --.

Signed and Sealed this

Ninth Day of September, 2003

JAMES E. ROGAN
*Director of the United States Patent and Trademark Office*